(12) United States Patent
James et al.

(10) Patent No.: US 10,139,987 B2
(45) Date of Patent: Nov. 27, 2018

(54) AUTOMATED GROUP RECOMMENDATION

(71) Applicant: Google Inc., Mountain View, CA (US)

(72) Inventors: Gavin James, Los Angeles, CA (US); Justin Lewis, Marina del Rey, CA (US)

(73) Assignee: Google LLC, Mountain View, CA (US)

( * ) Notice: Subject to any disclaimer, the term of this patent is extended or adjusted under 35 U.S.C. 154(b) by 277 days.

(21) Appl. No.: 14/711,475

(22) Filed: May 13, 2015

(65) Prior Publication Data

US 2016/0021179 A1 Jan. 21, 2016

Related U.S. Application Data

(60) Provisional application No. 62/026,446, filed on Jul. 18, 2014.

(51) Int. Cl.
| | |
|---|---|
| *G06F 3/0484* | (2013.01) |
| *G06F 3/0481* | (2013.01) |
| *H04N 21/25* | (2011.01) |
| *H04N 21/466* | (2011.01) |
| *H04N 21/4788* | (2011.01) |
| *H04N 21/61* | (2011.01) |
| *G06Q 10/10* | (2012.01) |
| *G06Q 50/00* | (2012.01) |

(52) U.S. Cl.
CPC ......... *G06F 3/04817* (2013.01); *G06Q 10/10* (2013.01); *H04N 21/252* (2013.01); *H04N 21/4668* (2013.01); *H04N 21/4788* (2013.01); *H04N 21/6125* (2013.01); *G06Q 50/01* (2013.01)

(58) Field of Classification Search
CPC .. G06F 3/04817; G06Q 50/01; H04N 21/252; H04N 21/4668; H04N 21/4788
See application file for complete search history.

(56) References Cited

U.S. PATENT DOCUMENTS

| | | | | |
|---|---|---|---|---|
| 8,392,836 | B1* | 3/2013 | Bau | G06Q 10/107 715/739 |
| 8,977,649 | B1* | 3/2015 | Hassidim | G06F 17/30958 705/319 |
| 2009/0186605 | A1* | 7/2009 | Apfel | G06F 3/0486 455/416 |
| 2011/0161883 | A1* | 6/2011 | Kennedy | G06F 3/0482 715/835 |
| 2011/0202968 | A1* | 8/2011 | Nurmi | G06F 21/10 726/1 |
| 2012/0110096 | A1* | 5/2012 | Smarr | G06Q 10/10 709/206 |
| 2012/0163574 | A1* | 6/2012 | Gundotra | G06Q 10/00 379/114.03 |

(Continued)

*Primary Examiner* — June Y Sison
(74) *Attorney, Agent, or Firm* — Patent Law Works LLP

(57) ABSTRACT

A system for automatically generating group recommendation comprises a processor and a memory storing instructions that, when executed, cause the system to receive information about a first user; construct a recommended group of other users using the information about the first user; provide the recommended group of other users as suggestion to the first user; and responsive to input from the first user, create a new group in a service, and performing an action on the new group in the service. The disclosure also includes similar methods and computer program products for the automatic generation and suggestion of groups.

24 Claims, 17 Drawing Sheets

(56) References Cited

U.S. PATENT DOCUMENTS

2012/0331405 A1* 12/2012 Eidelson ............ H04M 1/72552
                                                                         715/758
2013/0013683 A1* 1/2013 Elliott ................. G06Q 10/101
                                                                         709/204
2016/0255410 A1* 9/2016 Itoh .................. H04N 21/25891

\* cited by examiner

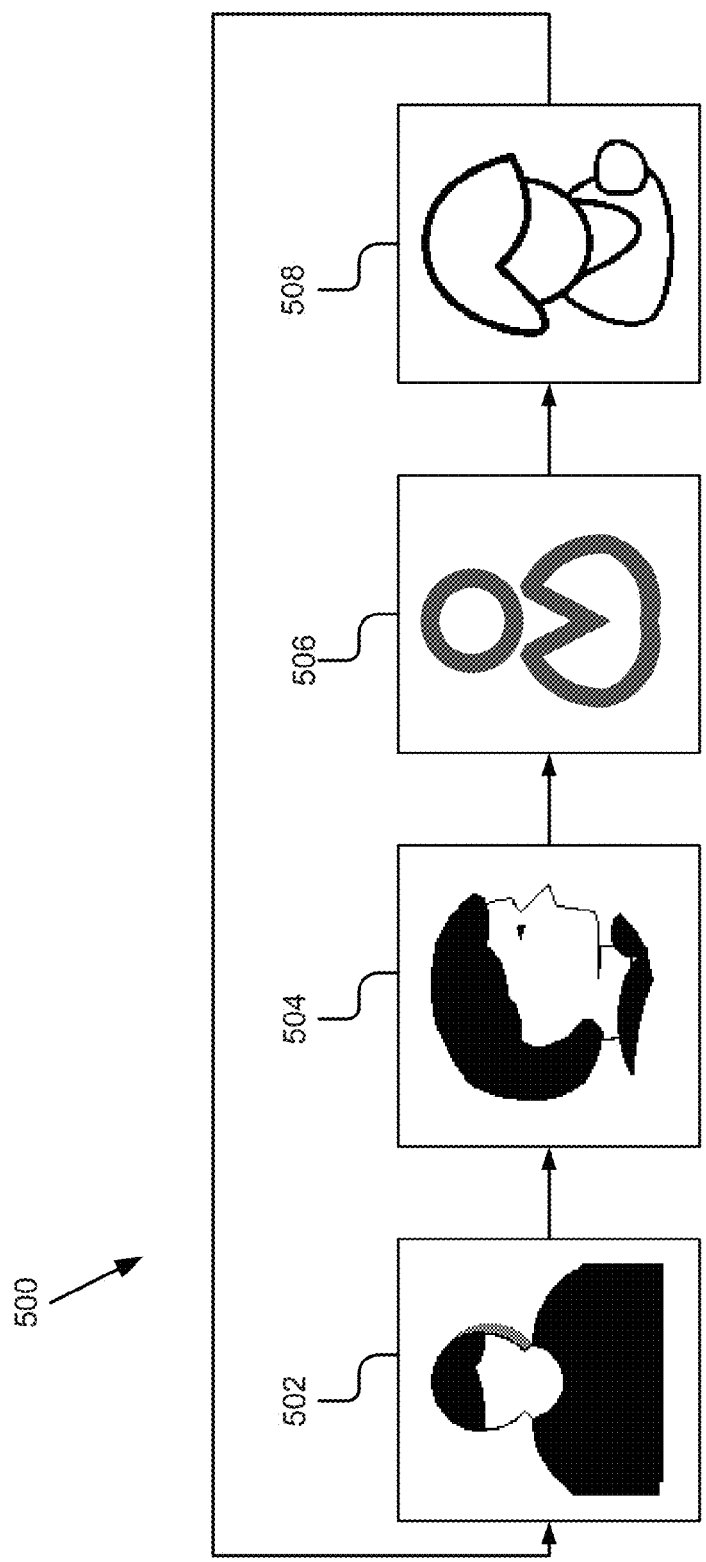

AUTOMATED GROUP RECOMMENDATION

RELATED APPLICATIONS

This application claims the benefit of U.S. Provisional Application Ser. No. 62/026,446, filed Jul. 18, 2014 which is hereby incorporated by reference.

BACKGROUND

The present disclosure relates to the automatic creation of groups. More specifically, the present disclosure relates to interfaces for presenting automatically created groups and selecting an action and group with a single input.

The popularity and use of the Internet, web browsers, social networks and other types of electronic communication has grown dramatically in recent years. In particular, social networks and video servers now offer a great amount of content including posts, images, endorsements, activity, videos, etc. Users are interested in viewing and sharing such content, but there are few existing ways of sharing that content with others. Some processes require the user to manually select recipients with whom they would like to share content. Manually selecting recipients can be time consuming, lead to inaccuracies and takes the user out of the flow of their enjoyment of the content.

In some systems, users may define groups and use those groups as recipients, but again, the process for defining groups is often a manual process with the aforementioned shortcomings. Adding users and groups is viewed as a chore to many users. As an example, users may have difficulty (or lack of desire for) sifting through user profiles or contact information while attempting to form a group. Furthermore, the existing mechanisms for automatic group creation are limited and difficult for user interaction. Particularly for social networks, existing automatic group creation mechanisms do not allow the viral sharing of content and dynamic or fluid creation and changing of groups which may be highly beneficial for the proliferation of the social network and curation of content.

SUMMARY

The present disclosure relates to systems and methods for automatic group recommendation and presentation. According to one innovative aspect of the subject matter in this disclosure, a system having one or more processors and a memory storing instructions that, when executed, cause the system to: receive information about a first user; construct a recommended group of other users using the information about the first user; provide the recommended group of other users as suggestion to the first user; and responsive to input from the first user, create a new group in a service, and performing an action on the new group in the service.

In general, another innovative aspect of the subject matter described in this disclosure may be implemented in methods that include receiving, using one or more processors, information about a first user; constructing, using the one or more processors, a recommended group of other users using the information about the first user; providing, using the one or more processors, the recommended group of other users as suggestion to the first user; and responsive to input from the first user, creating a new group in a service, and performing an action on the new group in the service.

Other implementations of one or more of these aspects include corresponding systems, apparatus, and computer programs, configured to perform the actions of the methods, encoded on computer storage devices.

These and other implementations may each optionally include one or more of the following features. For example, features may include the service is a social network service or a video sharing service; the information about the first user is one or more of profile data, content metadata, viewing history, explicit input, inferred data, proximity data or social network data and video sharing data; the action is one of posting a comment, posting an endorsement, sending a message, sending a photo, sending a video, sharing content, updating a group list, and modifying an access permission; or the plurality of icons corresponding to a set of most active users in the recommended group. The operations may include providing the recommended group of other users includes associating an icon with the recommended group and providing the icon for display; generating a slide show of a plurality of icons, wherein each of the icons is a pictorial representations of a user in the recommended group, and providing the slide show for display; generating an icon including a plurality of pictorial representations each pictorial representations corresponding to a user in the recommended group, and providing the icon for display; generating a plurality of icons, each icon being a pictorial representation of a user in the recommended group, and providing the plurality of icons for display to the first user in overlapping positions with icons for a set of most active users shown with less overlap than other icons corresponding to other users in the recommended group, and providing the plurality of icons for display; or providing the recommended group of other users includes retrieving a picture from a social network, the picture including a subset of users in the recommended group, and providing the picture for display.

These implementations are particularly advantageous in a number of respects. For instance, the automatic generation and recommendation of new groups for users may increase user engagement with social networks and third party applications including extending user sessions or group gaming sessions. Moreover, the technology allows users to interact with new groups and take an action with regard to that new group with a single action. Further, the new groups may be presented along with individual users in an integrated interface.

It should be understood, however, that the above features and advantages are not all-inclusive and many additional features and advantages are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

The present disclosure is illustrated by way of example, and not by way of limitation in the figures of the accompanying drawings in which like reference numerals are used to refer to similar elements.

FIGS. 5-8 are graphic representations of example pictorial icons associated with a group.

DETAILED DESCRIPTION

Systems, methods and interfaces for automatically generating a group of users and recommending that group of users are disclosed. While the systems, methods and interfaces of the present disclosure are now described in the context of web pages or mobile device screens showing videos and/or related information from a video server or related posts and other content from a social network, it should be understood that the systems, methods and interfaces can be applied to systems other than the social network, for example, third party servers, search servers, email servers, document servers, photo sharing servers, or gaming servers.

Figure 1:
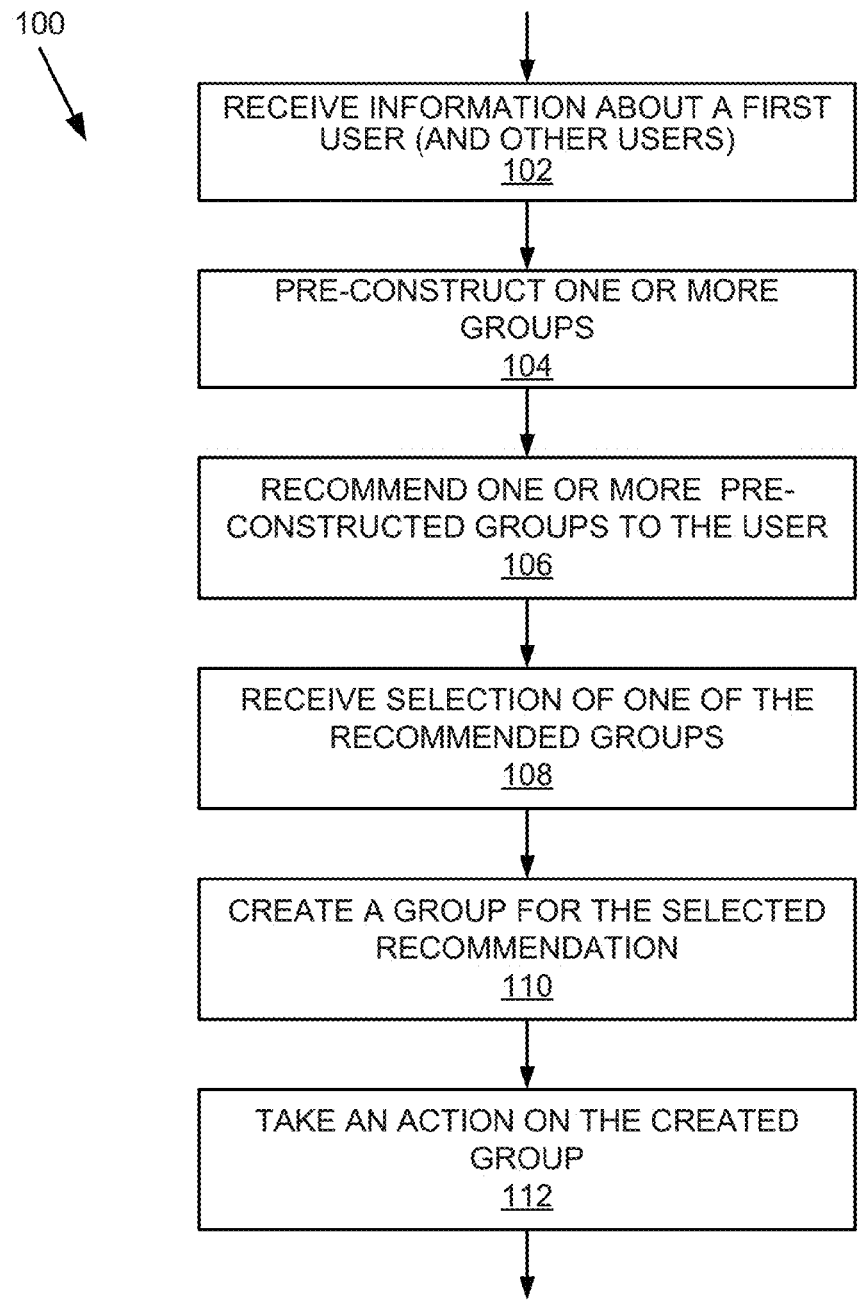
FIG. 1 is a flow chart of an example method for automatic group creation and recommendation.

FIG. 1 is a flow chart of an example method 100 for automatic group creation and recommendation. The method 100 begins by receiving 102 information about a first user. The information may be requested or received as the user interacts with a social network server (see 901 of FIG. 9) or a video sharing server (see 911 of FIG. 9). An implementation for receiving 102 information about a first user is described in more detail below with reference to FIG. 2A. Next the method 100 pre-constructs 104 one or more groups of users based upon the received information from block 102. The groups may be constructed using one or more variables. The variables for constructing the groups of users include, but are not limited to, a topic of interest to the first, an action of the first user, profile data of the first user, an identity of the first user, an inference about the first user, metadata about the first user, content metadata, interaction history, co-presence data, social network information or two or more of such variables. Next the method 100 recommends 106 one or more of the pre-constructed groups to the user. In some implementations, a single pre-constructed group determined to be most related to the context of the user may be recommended. In some implementations, a predetermined number of the pre-constructed groups satisfying a relatedness (or other type of criteria) threshold may be recommended to the user. In some implementations, the pre-constructed groups are recommended to the first user are presented in rank order based upon a factor, for example, number of users in the group, relatedness of the topic to the user, relatedness of the users in the group to the first user, geographic proximity, quantity of interaction with the users in the group, quality of interaction with the users in the group, number of overlapping interests for users in the group, etc. Once a plurality of groups is identified, the plurality of groups may be ordered into a recommendation list. The recommendation list may be ordered from a most likely on target group recommendation to a least likely group recommendation, as an example. In some implementations, the pre-constructed groups, may be weighted and grouped according to weighting. In this way, a plurality of groups may be identified. The identification of the groups may be based in part on affirmative actions by the user. For example, the groups may include strongly recommended groups, moderately recommended groups and not recommended groups. The strongly recommended groups and the moderately recommended groups would be presented to the user while the not recommended groups would be ignored. The method 100 continues by receiving 108 a selection of one of the recommended groups. Then the method 100 creates 110 a new group of users from the selected recommendation of a pre-constructed group. For example, the new group may be created and added to a list of groups available for the first user on the social network application 909. It should be understood that the new group may be created on other services offered by the servers depicted in FIG. 9. Next, the method 100 performs 112 an action on the newly created group. For example, if the user is watching a video from the video sharing server 911, the user may share (an action) that video with the users in the new group merely by selecting a button in a user interface that causes the method 100 to perform blocks 110 and 112. Similarly, if a user is reading a post from the social network application 909, the mere selection of the button causes the method 100 to create a new group and share the post with that group. A new group may be used to share a media item. In doing so, access permissions may be set to allow users of the new group to access the media item while prohibiting other non-group members from accessing the media item.

Figure 2A:
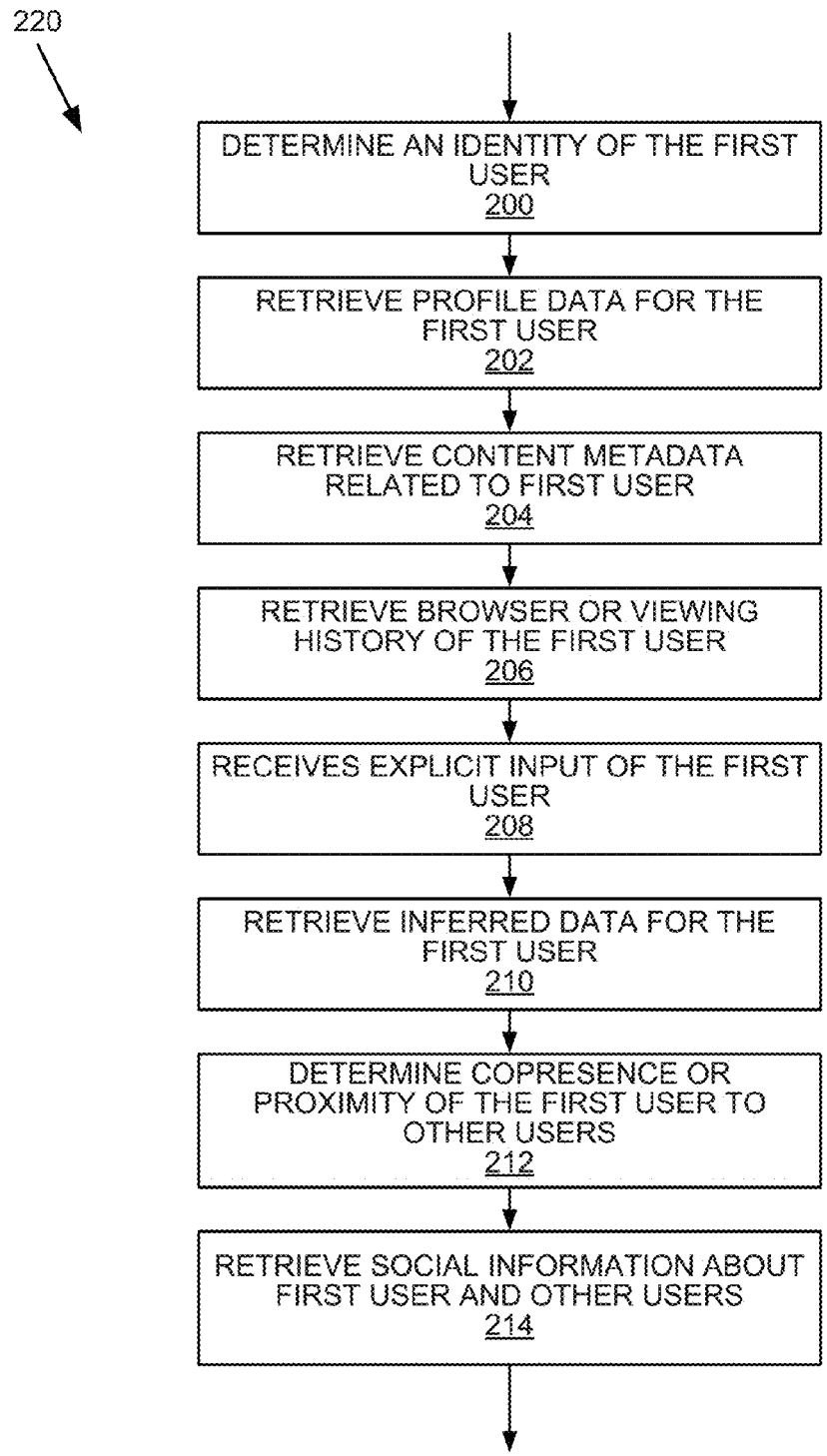
FIG. 2A is a flow chart of an example method for receiving information user for automatic group creation.

Referring now to FIG. 2A, an example method 220 for receiving information about the first user will be described. It should be understood that in some implementations, fewer steps or additional different steps for retrieving or capturing information about the user may be included in the method 220. Furthermore, it should be understood that in some implementations the order of the steps may be different than that shown in FIG. 2A. Throughout to the description that follows, many of the steps of the method 220 are described as retrieving; however, it should be understood that the information could just be received by systems that send the information to the automated group recommendation module 903.

The method 220 begins by identifying 200 the first user. For example, the method 220 may receive a request from a user or a third party service. The method 220 may recognize the user through a user ID and password associated with the user 920 or the client device 915. The method 220 may also recognize the user through use of the web browser 950. The web browser 950 may have browser cookies which may be used to identify the user. As a yet further example, the client device 915 may be recognized through an internet protocol (IP) address. This may also be done using the username and password for the social network 909. Regardless, the request may be associated with a user, and from the request the identity of the user determined. Various other identifications of the user can be used and are one input that may be used to pre-construct 104 one or more groups. Next, the method 220 retrieves 202 profile or meta-data for the first user. For example, the method 220 may receive profile data, including but not limited to, gender, residence area, interests, age, hobbies, photo, education, employer, profession, etc. about the first user from the social network application 909. In some implementations, the method 220 may receive profile data from other services depicted in FIG. 9. User metadata, for example, the company they work at or the school they attended might be used to identify users who are part of a community or family. Next, the method 220 retrieves 204 content metadata related to the first user. For example, if the first user is identified in a photo or video along with other users that content metadata may be used to suggest the inclusion of the other users in the photo for a possible group. Next the method 220 retrieves 206 browser or viewing history for the first user. The browser reviewing history may provide indications of recentness and topics about which the user is interested. These topics can be used to pre-construct 104 groups of users. Next, the method 220 receives 208 an explicit input of the first user. For example, the explicit input may be any input to the video sharing server 911 or the social network application 909 or any other input to any of the services depicted in FIG. 9. As a few illustrative examples, these explicit inputs may include a user visiting a website, posting a comment on a comment thread, endorsing content, performing a search, viewing a video, interactions with the video, interactions on the social network, etc. Next, the method 220 retrieves 210 inferred data for the first user. The inferred data may be based on the user's interaction with the social network application 909. This information can be used to better formulate and construct possible groups of users. Next, the method 220 determines 212 co-presence or proximity of the first user to other users. For example, the social network 909 in combination with other mobile technologies may be able to identify when the first user is with one or more other users in a conference room or located at the same restaurant. The co-presence data might be used to recommend groups of users who with each other at a given time and have a particular social relationship with each other. Similarly, proximity data might be used to recommend groups of users who are nearby each other and have another common factor, e.g., friends. Next the method 220 retrieves 214 social information about a first user and other users. For example, the method 220 can use posts, comments or endorsements to recommend groups of users who are interested in the same content. Similarly, various user edge affinity scores from the social network 909 might be used to find sets of other users and also used to filter users with stronger ties than others. It should be understood that any one or more of the above inputs may be combined to determine other users that could be included in a group. More specifically, two or more of the above inputs may be combined to better define the pre-constructed group and make it more relevant to the first user. For example, if a few users perform a search relating to topic 'A' and those same users comment on a video on a website related to topic 'A', the users may be identified as a possible group recommendation.

Figure 2B:
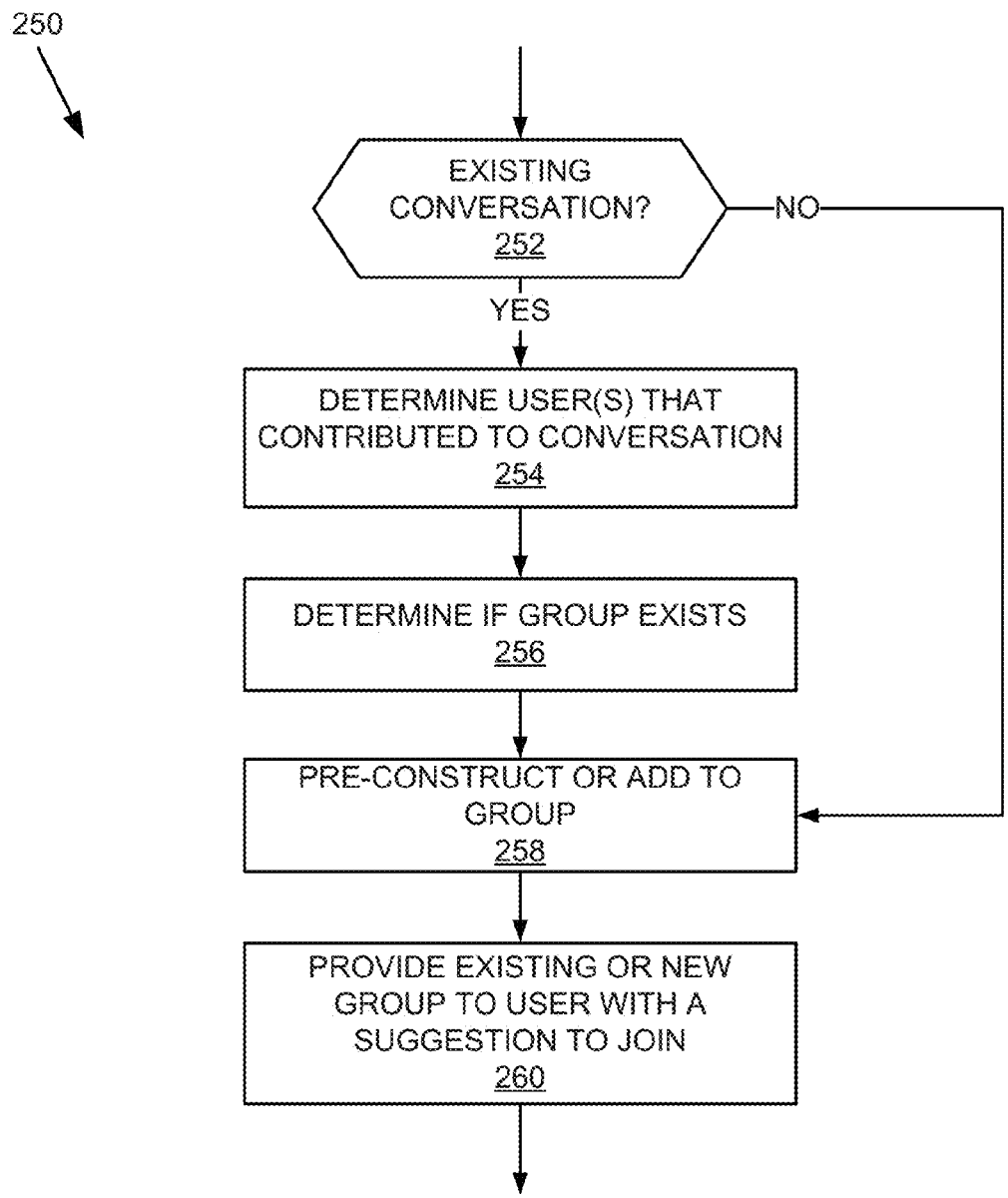
FIG. 2B is a flow chart of an example method creating a group recommendation based on a conversation on a software application.

FIG. 2B is a flow chart of an example method 250 for interacting with a conversation-based software application where group recommendation may be used. The method 250 determines 252 whether a user wishes to access an existing conversation (if not is assumed they are accessing a new conversation). If the user wishes to access an existing conversation, the method 250 determines 254 the users that have already contributed to the existing conversation since the user may be added to the group of the existing conversation. For example, a user may notice an ongoing conversation about a topic that interests her and may therefore request access to the existing conversation. Next, the method determines 256 if a group of users matching those identified in block 254 exists. If so, the method 250 need only at the first user to the existing group to create the new group in block 258. If not, the method 250 pre-constructs 258 a group with the users identified in block 254 and the first user. In some implementations, a request for access to the existing conversation results in the automatic creation of the group and addition of the first user to that group. Further, the group and conversation may be integrated such that the participants in the conversation are members of the group associated with the conversation. Alternatively, the conversation and the group may be independent. In this way, groups may be formed ephemerally for a conversation or may having enduring longevity through many conversations. If, however, the user wishes to access a new conversation, the method 250 transitions from block 252 directly to block 258. A recommendation for a group may be pre-constructed 258 for the new conversation. Details of this group recommendation are discussed above with reference to FIG. 1 and in further detail throughout the specification below. Regardless of whether the user wishes to access an existing conversation or a new conversation, the method 250 suggests 260 the pre-constructed new or existing group from block 258 that a user may want to join. For example, in some cases a user may be a natural fit for an existing group. This differs from whole group recommendations since an existing group is already formed (and the first user need only be added to the existing group) and the suggestion is made for the user to simply join the existing group.

The step of recommending one or more pre-constructed groups to the user may include generating various user interfaces as will be described in more detail below with reference to FIGS. 4A-4F. These user interfaces may include an icon (iconic representation) or other depiction to represent the recommended group. In one implementation, a recommended pre-constructed group is presented as a slide show including a plurality of pictorial representations corresponding to some of the users in the recommended group. For example, the user may interact with the icon representing a group recommendation to not only create the group but also to take actions on the entire group. For instance, the user may interact with the icon representing a recommended pre-constructed group to send messages as a part of a group chat, share a comments as part of a social networking threads, and send messages in simple messaging service (SMS) communication, as a few non-limiting examples. In order for users to be able to more readily identify a given group, an icon may be associated with the group. Since the group recommendation is automatic, the technology include methods to automatically generate and/or associate a pictorial icon with a group.

Figure 3:
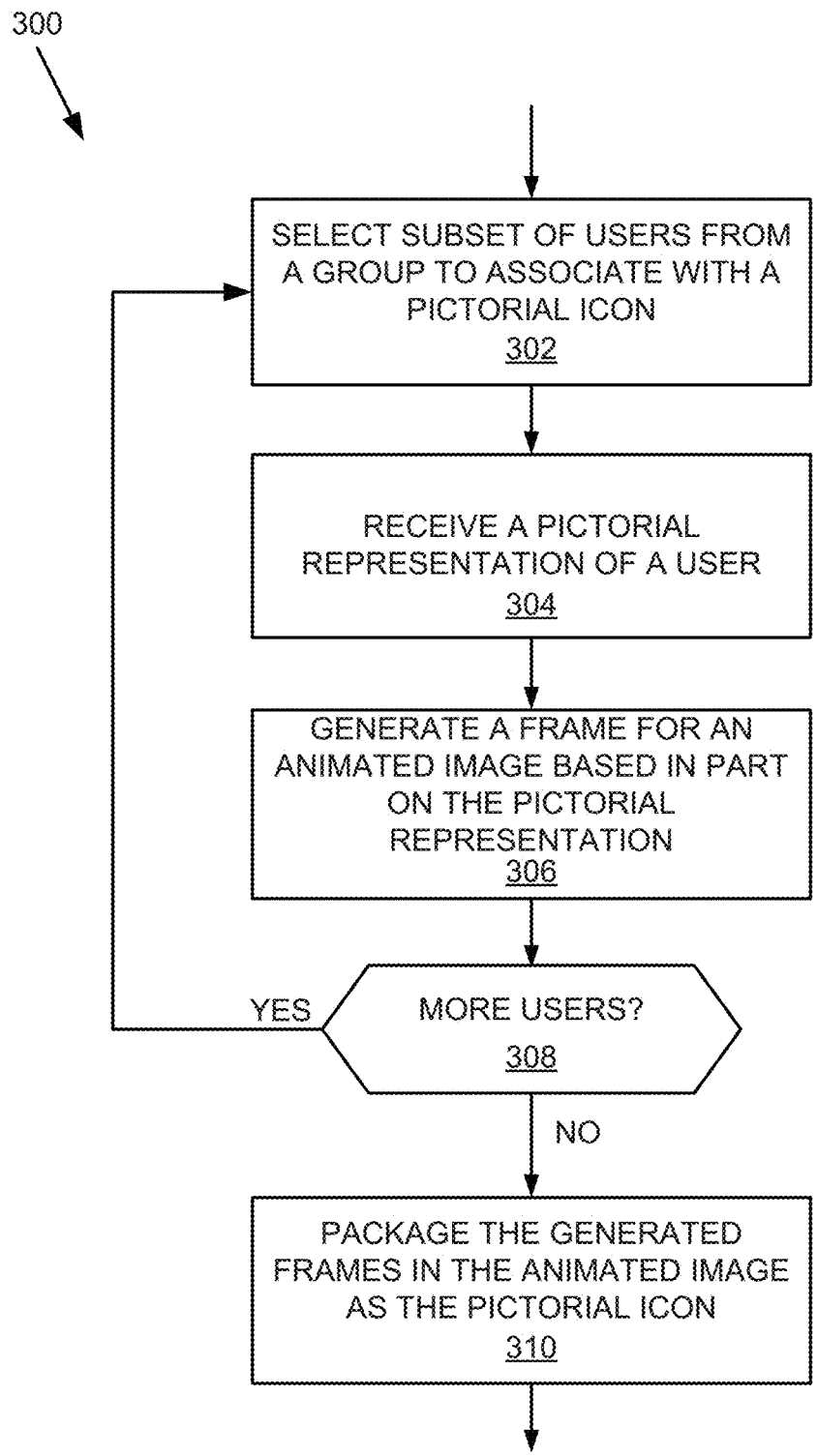
FIG. 3 is a flow chart of an example method for generating a slide show of pictorial representations of a subset of users in a group.

FIG. 3 is a flow chart of an example method 300 for generating a slide show of a plurality of pictorial representations corresponding to a subset of users in the group. As shown in FIG. 3, the method 300 includes selecting 302 a subset of users from a recommended pre-constructed group to associate with an icon (iconic representation). For example, the subset of users may be the most active users in the recommended pre-constructed group or it may be the most representative users in the group. Various other criteria could be used to select the subset of users including any one of the factors described above with reference to FIG. 2A. For instance, the group may be composed of identifiable factions and the most known user from each faction may be depicted with the pictorial icon. A faction may be a set of users that are relatively highly interconnected in a social network, for instance.

Figure 9:
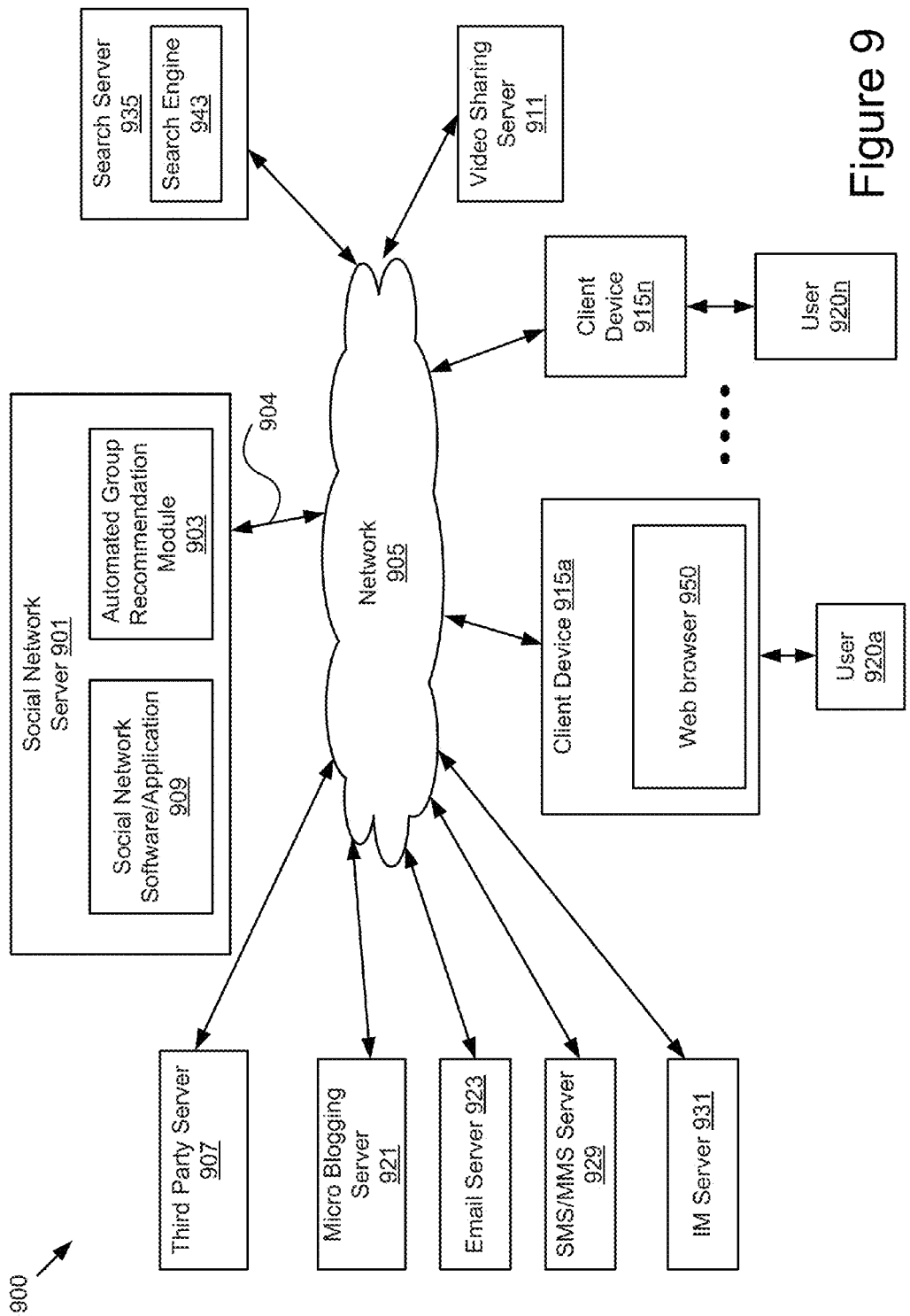
FIG. 9 is a high-level block diagram illustrating an example system for automatic generation of a group recommendation.

The method 300 continues by receiving 304 a representation of a user. The pictorial representation of a user may be a profile photo in a social network or may be an avatar, a picture of a favorite object, family member, pet, etc. as few non-limiting examples. Next, a frame is generated 306 for the image based in part on the pictorial representation. The pictorial representation may be scaled or simplified to fit the purposes of the slide show. In one example, the image may be reduced to a subset of continuous colors by passing the image through a filter. The method 300 continues to iterate through the subset of users in as shown in 308. In this way, each user in the subset of users may have a pictorial representation fetched and used to generate a frame for the slide show. The frame length may be set for a particular duration, like one second. Next, the method 300 packages 310 the generated frames as a slide show. For example, the generated frames may be packaged in a graphics interchange format (GIF) file and delivered to the web browser 950 over the network 905 using the hypertext transfer protocol (HTTP). The web browser 950 may render the GIF file for display to the user 920 on the client device 915, as shown in FIG. 9. An example slide show will be described in more detail with reference to FIG. 5 below. In some implementations, rather than a slide show, the images may be converted to a looping video with transitions between images or an animated series of icons and associated transitions.

Referring now to FIGS. 4A-4F, various implementations for a user interface to present a recommended pre-constructed group as an icon (iconic representation) will be described.

Figure 4A:
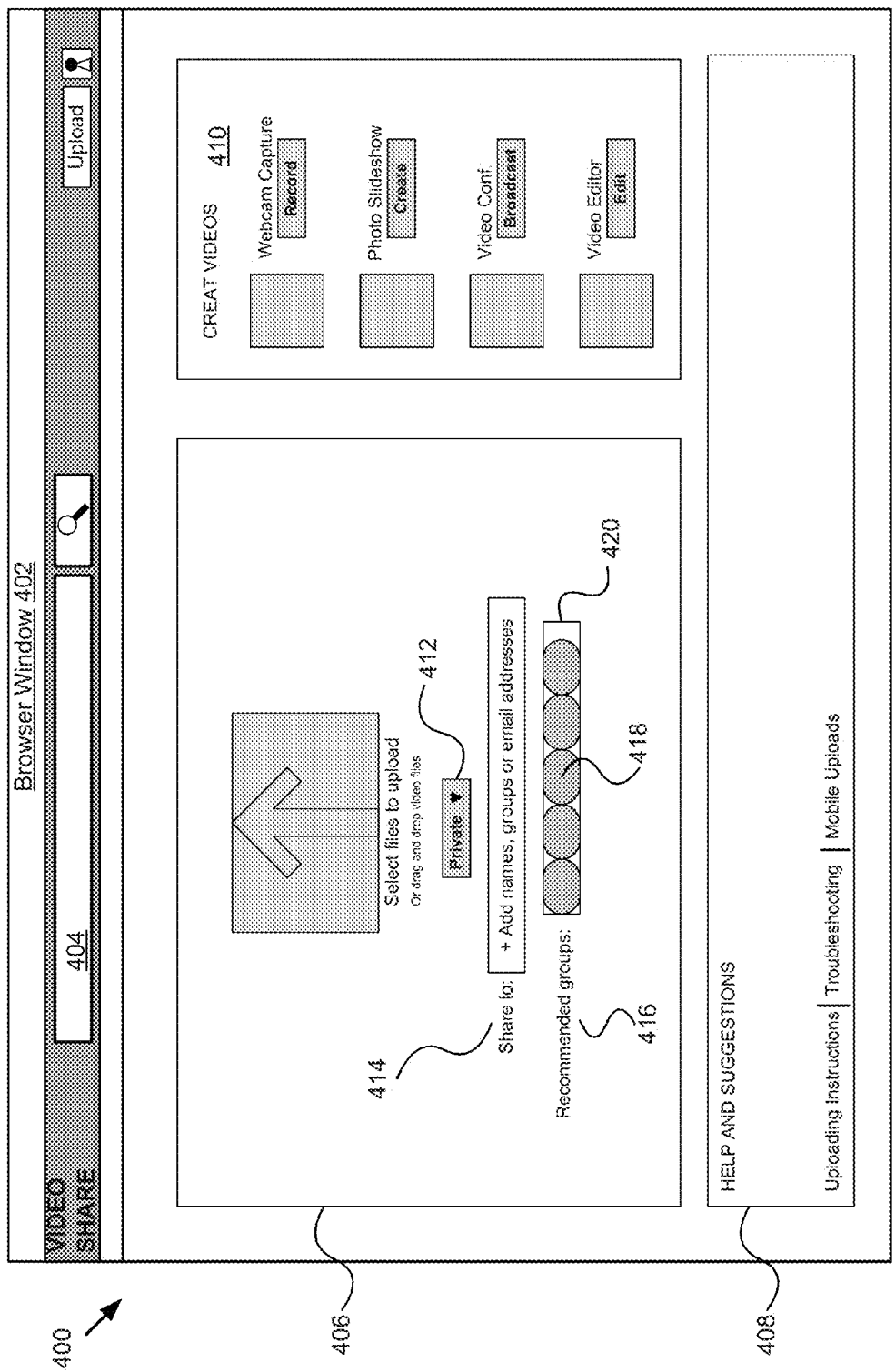
FIGS. 4A-4F are graphic representations of example user interfaces for recommending automatically created groups.

FIG. 4A is a graphic representation of an example user interface 400 presented on a client device 915. The user interface 400 includes browser window 402 a having a upper portion 404 indicating that it is a video sharing site and having a search box, a search button, an upload button and identification of the user if she is logged in. The browser window 402 also includes an upload section 406, a help section 408, and a creation section 410. The help section 408 includes help information as well as links to transition to other more detailed help pages. The creation section 410 includes selectable buttons and icons corresponding to recording for web cam capture, creation of a photo slide show, transmission for videoconferencing and editing for a video editor. The upload section 406 provides an area in which video files for uploading to the video sharing service can be selected or "dragged and dropped." The upload section 406 also includes a drop-down menu 412 for selecting whether the video files uploaded will be publicly shared, privately shared, or unlisted (not shared). The upload section 406 also includes an area 414 including a box for the user to input names, groups or email addresses of the users with which the uploaded video will be shared. The present disclosure advantageously also includes an additional area 416 for presenting recommended pre-constructed groups with which to share an uploaded video. The additional area 416 includes a box 420 including one or more icons 418 representing different groups with which the uploaded video may be shared. In this example, there are five recommended groups as represented by the five icons 418 in box 420. It should be understood that in FIG. 4A the icons 418 are represented by ovals. These icons 418 may have various other shapes and specific examples of icons will be described in more detail below with reference to FIGS. 5-8. It should be noted that this user interface 400 is particularly advantageous because it allows a user to share a video with a new group simply by selecting the recommended group from those listed in the box. For example, an icon 418 may be selected using the cursor. In some implementations, as the user moves the cursor over the icon 418 a list of users that are part of the recommended group are displayed below the selected icon.

Figure 4B:
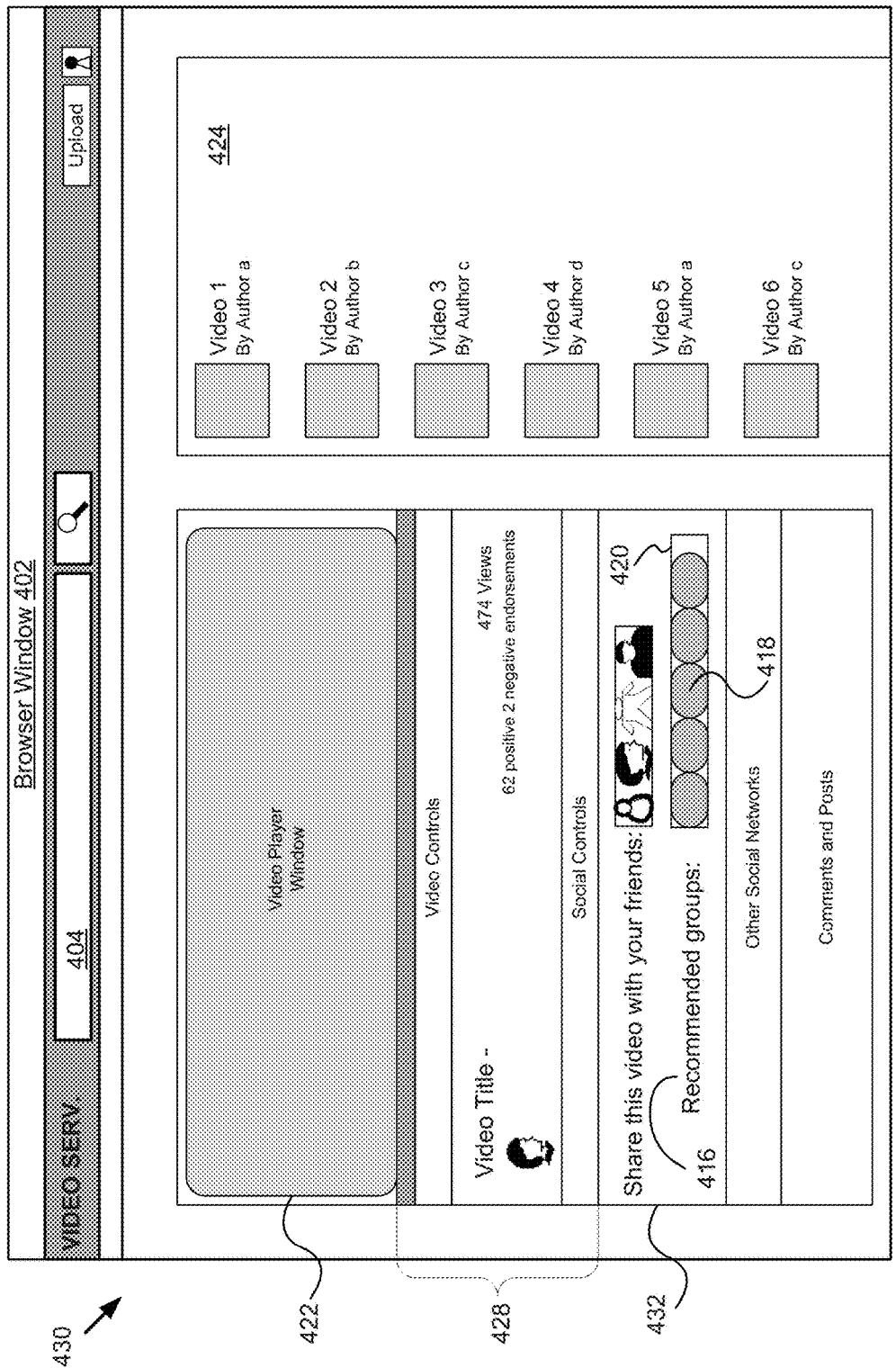

FIG. 4B is a graphic representation of an example user interface 430 presented on a client device 915. The user interface 430 includes a browser window 402 having an upper portion 404, a video player window 422, a recommended video area 424, a control area 428, a sharing area 432 and other portions. The video player window 422 provides an area for the display videos. The recommended video area 424 presents a plurality of thumbnail images and corresponding titles and authors of the videos. The thumbnails and the titles are selectable for display of that corresponding video in the video player window 422. Near the video player window 422 is the control area 428. The control area 428 provides feedback on the frame of the video being presented, controls for the presentation of the video such as frame rate, sound, pause, play, etc., and metadata associated with the video being displayed including the title, author and the number of views. The user interface 430 advantageously includes a sharing area 432 that enables the user to share the video being displayed in the video player window 422. The sharing area 432 includes a box including icons representing various users that are selectable to share the video with a particular user. The sharing area 432 also includes the additional area 416 to present recommended groups. Similar to the interface described above with reference to FIG. 4A, the additional area 416 includes a box 420 to present a plurality of icons 418 representing different groups with which to share the video being displayed. The icons 418 in the box for 20 have functionality similar to that described above with reference to FIG. 4A. As noted above, this user interface 430 is particularly advantageous because it allows the user with single click of an icon 418 to share the video being displayed with a recommended group and add/create that recommended group to the user's group list.

Figure 4C:
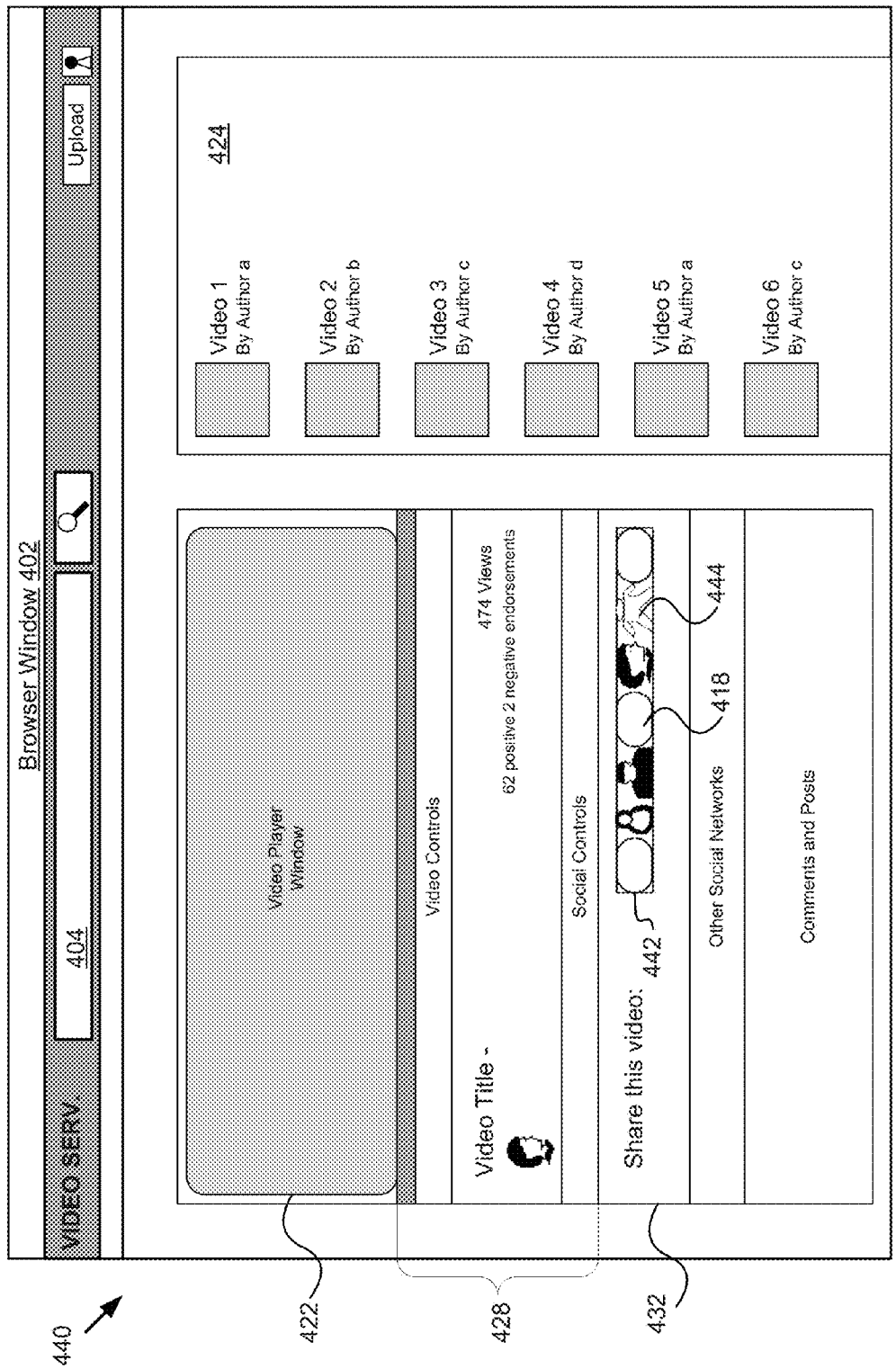

Referring now to FIG. 4C, a graphic representation of an example user interface 440 for presenting recommended groups is shown. The user interface 440 includes similar elements to user interface 430, and like reference numerals are used to reference like parts with the same or similar functionality. The example user interface 440 provides a single box 442 to show both other users and recommended groups with which the video may be shared. In this example, the box 442 intermixes icons 418 corresponding to recommended groups as well as icons 444 representing specific users. It should be understood that the order of the icons may be set with the most relevant icon on the left to the lease relevant on the right based on any number of the factors described above with reference to FIG. 2A.

Figure 4D:
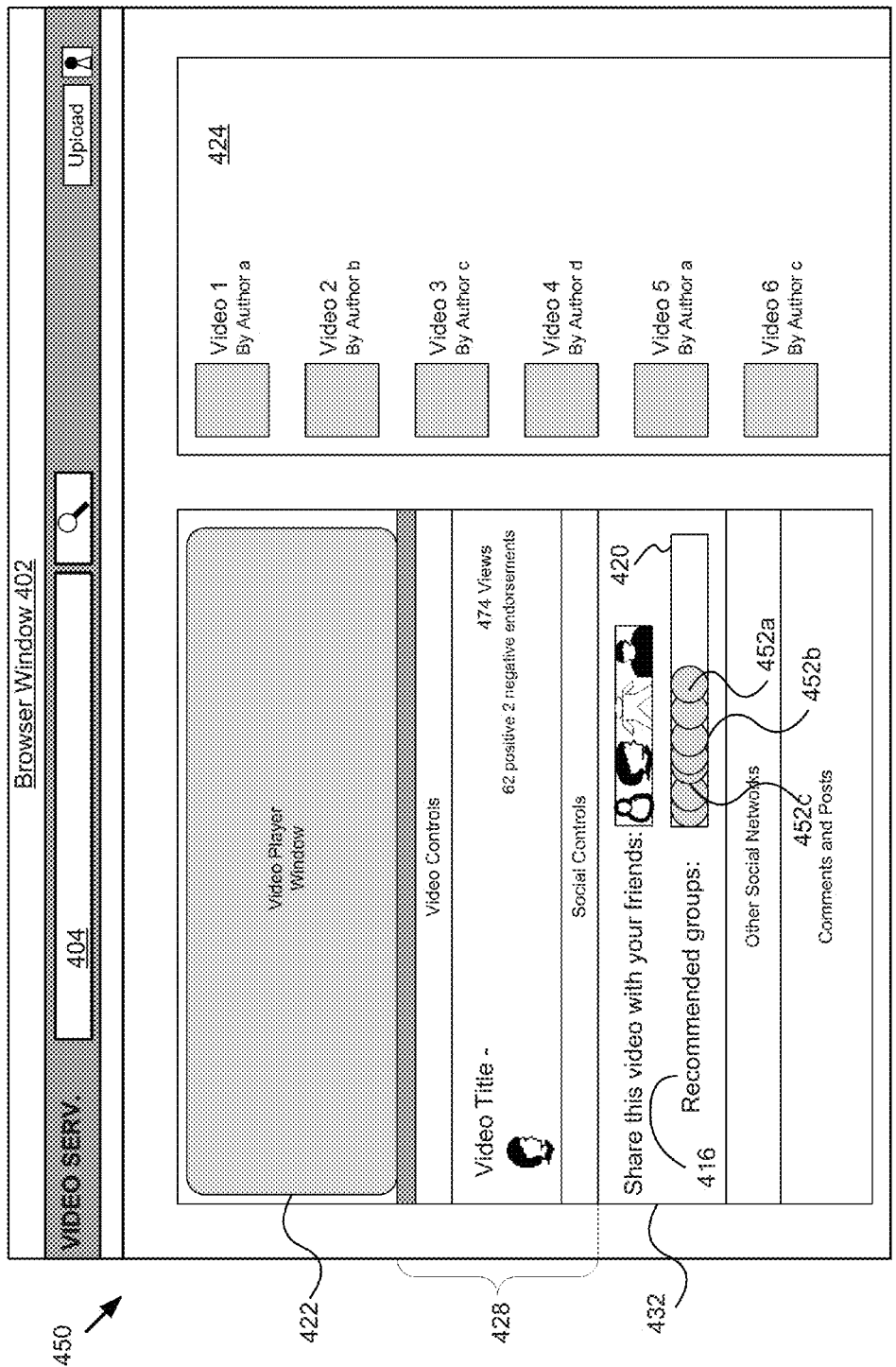

Referring now to FIG. 4D, a graphic representation of an example user interface 450 for presenting recommended groups is shown. The user interface 450 includes similar elements to user interface 430, and like reference numerals are used to reference like parts with the same or similar functionality. The example user interface 450 again provides a box 420 to present icons 452 representing recommended groups. However, in this example, the different recommended groups are shown with overlapping icons 452a, 452b, and 452c. In this example, the icons 452a, 452b, representing group most relevant or related to the user are shown with the least amount of overlap as compared with other icons 452c representing other groups which are shown more obscured by other icons in the box 420. This is advantageous because it makes the most relevant groups easy to select and the less relevant groups more difficult to select.

Figure 4E:
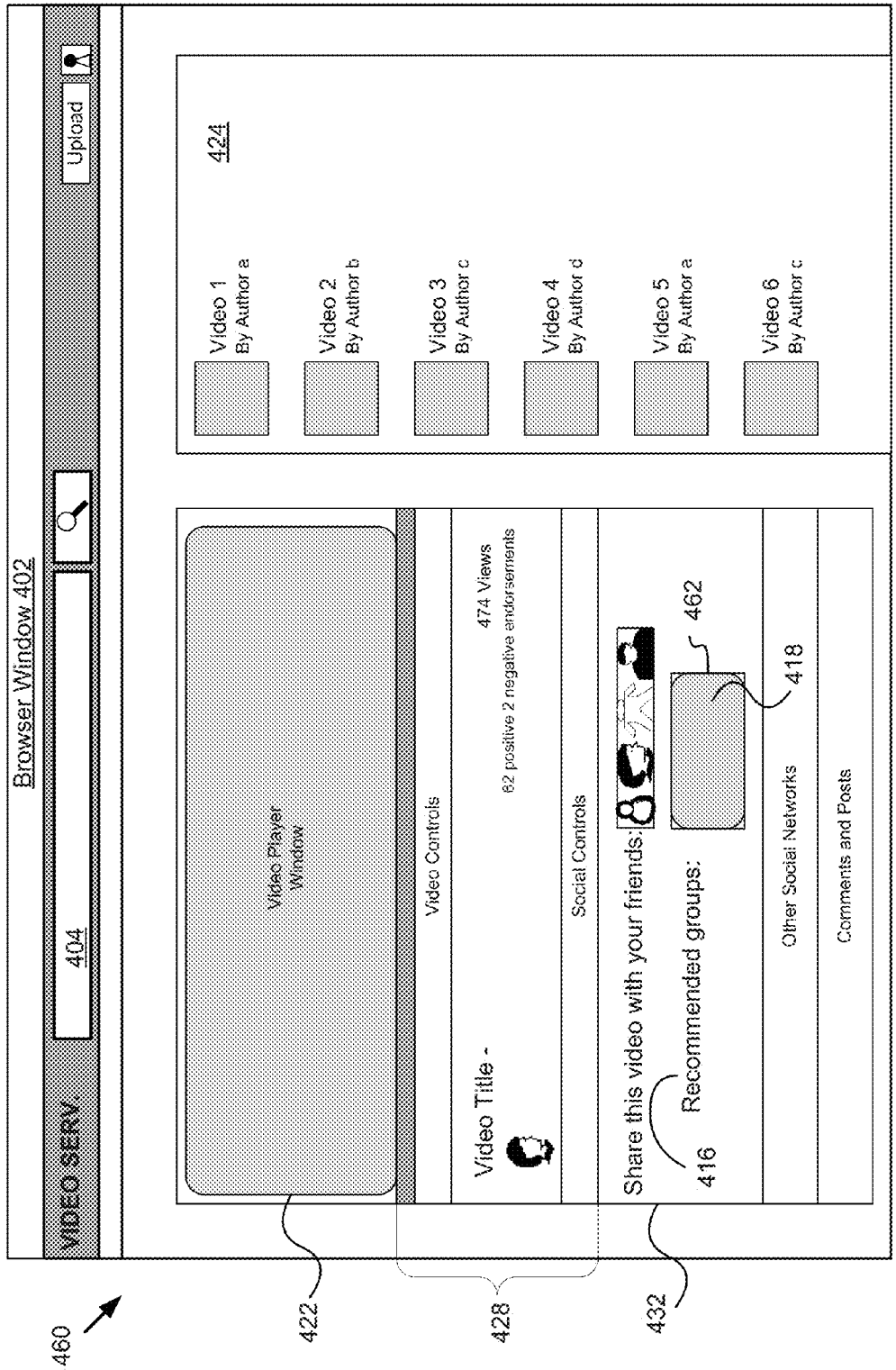

Referring now to FIG. 4E, a graphic representation of an example user interface 460 for presenting recommended groups is shown. The user interface 460 includes similar elements to user interface 430, and like reference numerals are used to reference like parts with the same or similar functionality. The example user interface 460 again provides a box 462 to present an icon 418 representing a recommended group. However, this implementation of the user interface 460 can be used to recommend only a single group. The box 462 is greater in size for presentation of a slide show, a multiuser icon, a collage of icons or a picture as will be described below with reference to FIGS. 5 to 8.

Figure 4F:
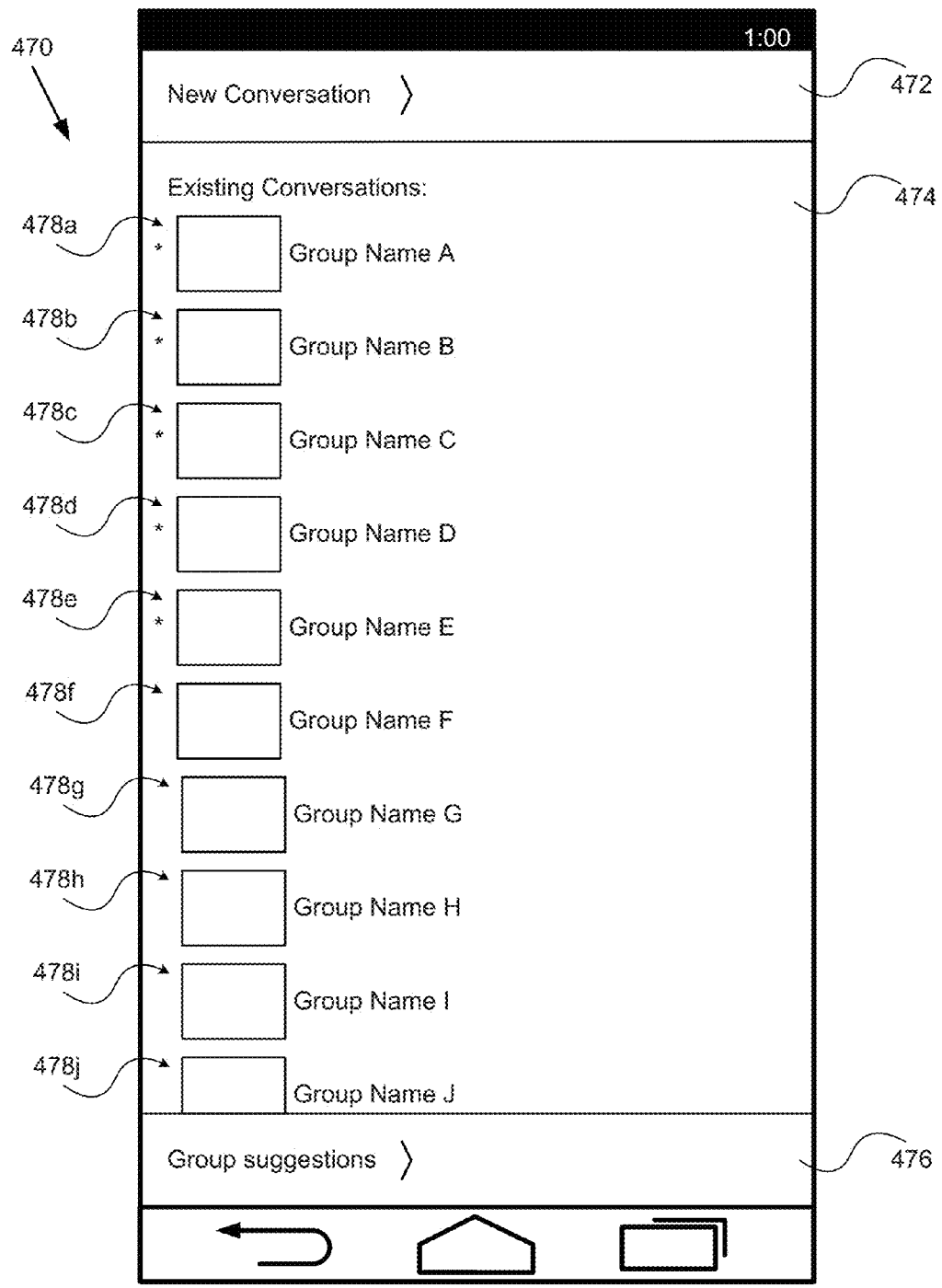

FIG. 4F is a graphic representations of an example user interface 470 for a conversation-based software application where group recommendation may be presented. The user interface may 470 include three sections: a new conversations section 472, an existing conversations section 474, and a group suggestions section 476.

The existing conversations section 474 may list a set of existing conversations. The set of existing conversations, may be ordered by recency and/or whether the conversations has been read or accessed by the user. The existing conversations section 474 may also include an icon for the conversation and/or group and an indicator (e.g. "*") to indicate whether a conversation has been read or accessed by the user, as indicated by 478a-j. The existing conversations may also contain a group name. Group names may be generated through a common interest (e.g. a team name or university) or may be a concatenation of the names of the members of the group. In this way, group names may be automated through use of the automated group recommendation module 903.

The group suggestions section 476 may allow a user to see suggestion of which existing groups and/or conversations the user should look into joining. These suggestions may be based on common interests, common friends on a social network, common browsing behaviors, etc.

The new conversations section 472 allows to request group recommendations. The conversation, for example, may be relatively integrated with conversations. For example, a user may need to be added to a group before accessing a conversation associated with the group.

FIGS. 5-8 are graphic representations of example pictorial icons 500, 600, 700 and 800 for representing a recommended group and presenting the recommended group to a user. In particular, FIG. 5 shows example slides of a slide show 500 where each slide is an icon 502, 504, 506 and 508 representing a respective user in the recommended group. It should be understood that the icons 502, 504, 506 and 508 may be a subset of all the users in the recommended group. The slide show transitions 500 from presenting each one of the icons 502, 504, 506 and 508 as depicted by the arrows in FIG. 5. Generation of such a slide show, video, or animated image 500 is discussed above with particular reference to FIG. 3. The example slide show 500 includes pictorial representation of four users 502, 504, 506 and 508. The slide show 500 may repeatedly cycle through the pictorial representation images 502, 504, 506 and 508 as indicated by the arrows. The slide show 500 may be formed from a subset of any number of users from a recommended group. As an example, the subset of users may be a predetermined number of the most active users at a given time. As noted above, the slide show 500 may be presented as one icon 418 in the user interface of FIG. 4B or as the single icon 418 in box 462 of FIG. 4E.

Figure 6:
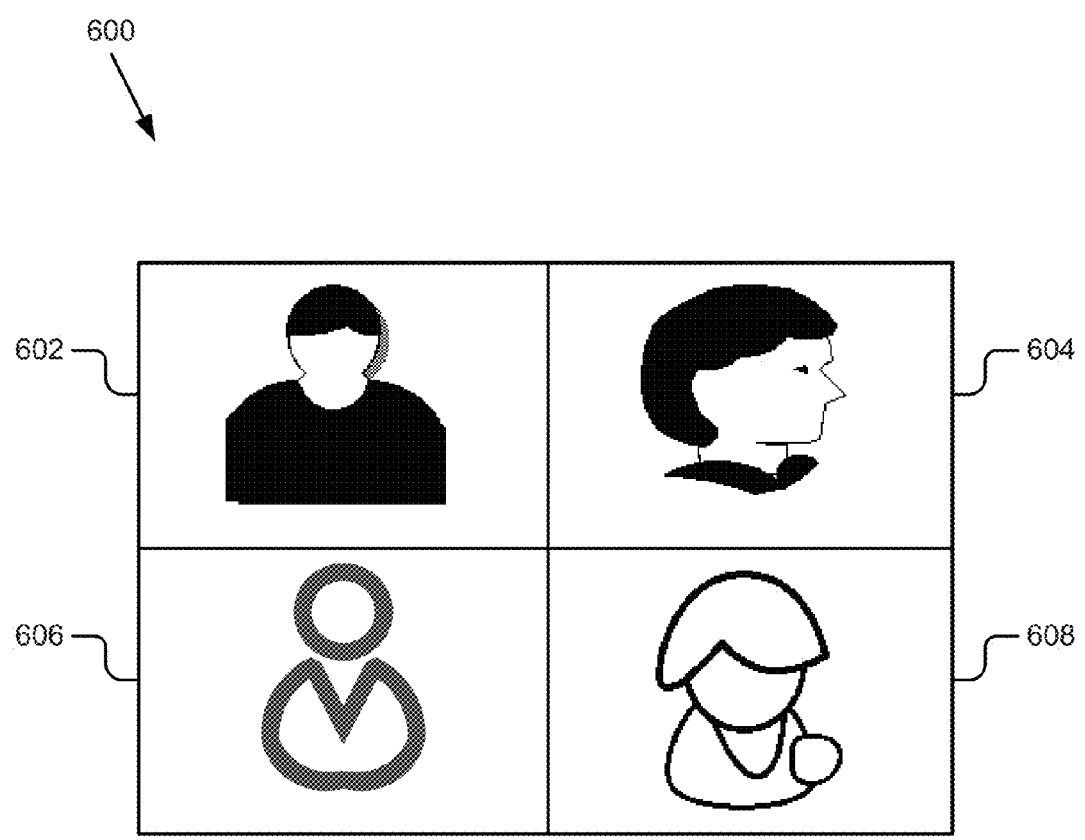

Referring now to FIG. 6, an example pictorial icon 600 includes a plurality of regions that each display a pictorial representation 602, 604, 606, 608 of a most active users in the recommended. In one instance, the pictorial representations 602, 604, 606, 608 may be scaled to fit in their respective regions of the pictorial icon 600. In the depicted example, the pictorial icon 600 may be divided into four equal quadrants as shown. Each quadrant may then be used to display a pictorial representation 602, 604, 606, 608 of a user. It should be understood that the pictorial icon 600 of FIG. 6 is merely one example, and that the pictorial icon may have any number of regions from 2 to an area where the individual icons can be seen by the user is visually distinct. For example, rather than four regions, there may be 6, 8, 9 or more. As noted above, the pictorial icon 600 may be presented as one icon 418 in the user interface of FIG. 4B or as the single icon 418 in box 462 of FIG. 4E.

Figure 7:
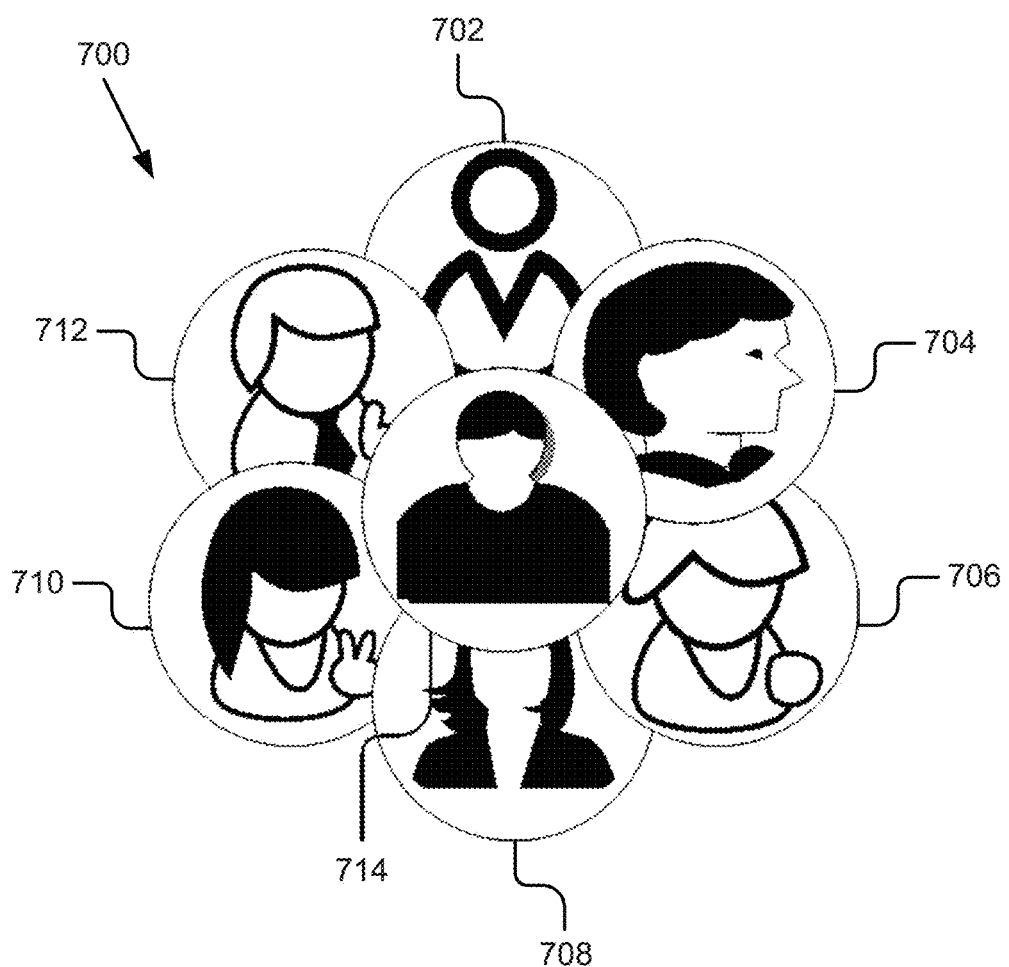

Turning now to FIG. 7, an example pictorial icon 700 includes a plurality of overlapping icons that display pictorial representations of at least a subset of users in the group. For example, the icons 702, 704, 706, 708, 710, 712 and 714 may be round and may be overlapped by one or more neighboring sub-icons. In one instance, the overlapping may be about 30%. Moreover, the icon 714 located in the middle of the pictorial icon 700 may be arranged so that it is not overlapped by any neighboring icons 702, 704, 706, 708, 710 and 712. The pictorial icon 700 may include pictorial representations of all of the users in the group or may include a select subset as outlined above with reference to other example pictorial icons. Again, the pictorial icon 700 may be presented as one icon 418 in the user interface of FIG. 4B or as the single icon 418 in box 462 of FIG. 4E.

Figure 8:
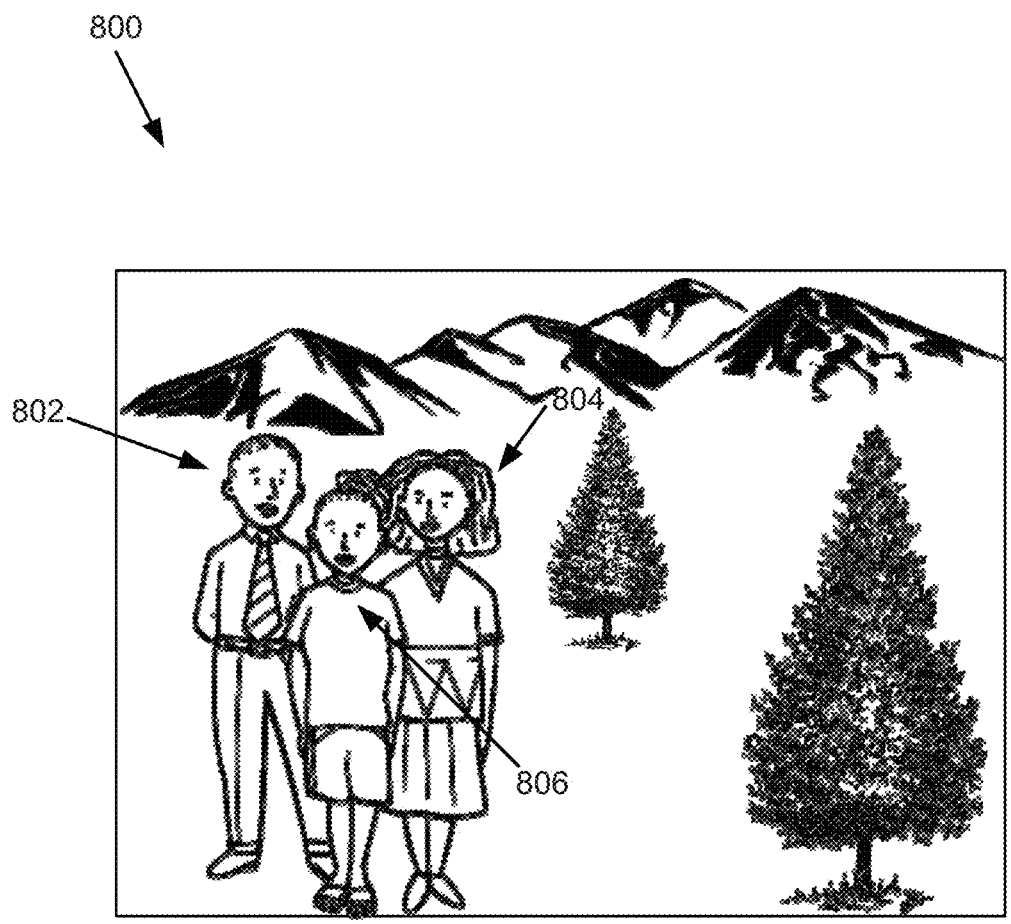

In FIG. 8, an example pictorial icon 800 comprises a picture from a social network where at least a subset of users in the group are associated with the picture. In some cases, a picture from a social network may be obtained that includes members 802, 804 and 806 of the group to be represented by the pictorial icon 800. The picture may be 'tagged' or associated with the picture. In this way a picture with representative members may be selected for use as the pictorial icon 800. In some instances, the picture may only be associated with (e.g. include) members of the group. For example, the picture not have any other users tagged that are not members of the group. In other instances, users tagged in the picture that are not members of the group may be obscured or deleted. For example, a non-member of the group may be cropped out of a picture. In another example, a non-member of the group may be removed by covering the tagged area with ambient artifacts. In some instances, facial and body recognition may be used to identify which area of the picture to obscure.

FIG. 9 illustrates a high-level block diagram of a system 900 for group recommendation according to some implementations of the present disclosure. The illustrated system 900 includes client devices 915a-915n (also referred to herein individually and collectively as 915) that are accessed by users 920a-920n (also referred to herein individually and collectively as 920), a social network server 901 having a social network application 909 and an automated group recommendation module 903. The system 900 also includes a number of products or services offered by a third party server 907, a video sharing server 911, a micro blogging server 921, an email server 923, a Short Message Service (SMS)/Multimedia Messaging Service (MMS) server 929, an Instant Messaging (IM) server 931 and a search server 935. In the illustrated implementation, these entities are communicatively coupled via a network 905. These systems 901, 907, 911, 921, 923, 929, 931, 935 are merely examples and the system 900 in some implementations includes an advertisement server, a document server, a blogging server, a news feed server, a video sharing server, a photo sharing server, a map server and any other third party server, etc. The search server 935, may include a search engine 943.

The client devices 915a-915n in FIG. 9 are used by way of example. While FIG. 9 illustrates two client devices 915a and 915n, the present disclosure applies to any system architecture having one or more client devices 915. Furthermore, while only one network 905 is coupled to the client devices 915a-915n, the social network server 901, the third party server 907, the video sharing server 911, the micro blogging server 921, the email server 923, the Short Message Service (SMS)/Multimedia Messaging Service (MMS) server 929, the Instant Messaging (IM) server 931 and the search server 935, in practice one or more networks 905 can be connected to these entities. Furthermore, while only one the third party server 907 is shown, the system 900 can include one or more the third party servers 907. Furthermore, while only one social network server 901 is shown, the system 900 can include one or more social network servers 901.

While shown as operational on the social network server 901 in FIG. 9, in some implementations all or part of the automated group recommendation module 903 may be operational on the one or more of the client devices 915, the third party server 907, the video sharing server 911, or other servers. The automated group recommendation module 903 interacts with the servers 901, and 907, via the network 905. The automated group recommendation module 903 is also coupled for communication with the client device 915a, which is connected to the network 905. The user 920a interacts with the client device 915a. Similarly, the client device 915n is coupled to the network 905 and the user 920n interacts with the client device 915n. The user 920 is a human user of the client device 915. It should be recognized that the automated group recommendation module 903 can be stored in any combination of the devices and servers, or in only one of the devices or servers. The automated group recommendation module 903 will be describe in more detail with reference to FIGS. 10-11.

The social network server 901 is coupled to the network 905 via signal line 904 for communication and cooperation with the other components of the system 900. In some implementations, the social network server 901 includes the social network software/application 909. Although only one social network server 901 is shown, it should be recognized that multiple servers may be present. A social network may be any type of social structure where the users 920 are connected by a common feature. The common feature includes relationships/connections, e.g., friendship, family, work, an interest, etc. The common features are provided by one or more social networking systems, for example, those included in the system 900, including explicitly-defined relationships and relationships implied by social connections with other online users, where the relationships form a social graph. In some examples, the social graph can reflect a mapping of these users and how they are related. The phrase social graph as used herein encompasses its plain and ordinary meaning including, but not limited to, a file that includes the relationships between the users in a social network. For example, users can be friends, acquaintances, have business relationships, one user can follow another user, one user can subscribe to another user, share with other users or a specific user, etc. Furthermore, it should be understood that the social network server 901 and the social network software/application 909 are representative of one social network and that there may be multiple social networks coupled to the network 905, each having its own server, application and social graph. For example, a first social network may be more directed to business networking, a second may be more directed to or centered on academics, a third may be more directed to local business, a fourth may be directed to dating and others of general interest or a specific focus.

In some implementations, the social network server 901 receives and sends data and social information provided by the other servers 907, 911, 921, 923, 929, 931 and 935. For example, the social network server 901 receives and sends any social information or events performed on any web pages and/or applications hosted by the servers 907, 911, 921, 923, 929, 931 and 935. The web pages and/or applications include a user interface allowing a user 920 to respond to, comment or endorse a product, a video, a search result, a widget, a post, a comment, a photo, an article, etc., shown on the web pages and/or applications.

In some implementations, the social network server 901, the third party server 907, the video sharing server 911, the Micro Blogging server 921, the email server 923, the SMS/MMS server 929, the IM server 931 and the search server 935 are hardware servers including a processor, a memory, and network communication capabilities.

The client devices 915 can be any computing device including one or more memory and one or more processors, for example, a laptop computer, a desktop computer, a tablet computer, a mobile telephone, a personal digital assistant (PDA), a mobile email device, a portable game player, a portable music player, a television with one or more processors embedded therein or coupled thereto or any other electronic device capable of accessing a network. In some implementations, the system 900 includes a combination of different types of client devices 915. For example, a combination of a personal computer and a mobile phone. As will be described below, it should be understood that the present technologies can operate on different models other than a client-server architecture. For example, the client devices 915 may include the automated group recommendation module 903 and include different services. The client device 915 will be described in more detail with reference to FIG. 10.

The browser 950 can be a web browser stored on the on the client device 915 and configured for two-way communications with the servers 901, 907, 911, 921, 923, 929, 931 and 935. For example, the browser 950 is a software application for retrieving, presenting and traversing information resources on the web.

The network 905 enables communications between the client devices 915a-n, the social network server 901, the third party server 907, the Micro Blogging server 921, the email server 923, the SMS/MMS server 929, the IM server 931 and the search server 935. Thus, the network 905 can include links using technologies including, for example, Wi-Fi, Wi-Max, 2G, Universal Mobile Telecommunications System (UMTS), 3G, Ethernet, 802.11, integrated services digital network (ISDN), digital subscriber line (DSL), asynchronous transfer mode (ATM), InfiniBand, PCI Express Advanced Switching, etc. Similarly, the networking protocols used on the network 905 can include the transmission control protocol/Internet protocol (TCP/IP), multi-protocol label switching (MPLS), the User Datagram Protocol (UDP), the hypertext transport protocol (HTTP), the simple mail transfer protocol (SMTP), the file transfer protocol (FTP), lightweight directory access protocol (LDAP), Code Division Multiple Access (CDMA), Wideband Code Division Multiple Access (WCDMA), Global System for Mobile communications (GSM), High-Speed Downlink Packet Access (HSDPA), etc. The data exchanged over the network 905 can be represented using technologies and/or formats including the hypertext markup language (HTML), the extensible markup language (XML), etc. In addition, all or some of links can be encrypted using conventional encryption technologies, for example, the secure sockets layer (SSL), Secure HTTP and/or virtual private networks (VPNs) or Internet Protocol security (IPsec). In some implementations, the entities can use custom and/or dedicated data communications technologies instead of, or in addition to, the ones described above. Depending upon the implementation, the network 905 can also include links to other networks.

In some implementations, the network 905 is a partially public or a wholly public network, for example, the Internet. The network 905 can also be a private network or include one or more distinct or logical private networks (e.g., virtual private networks, Wide Area Networks ("WAN") and/or Local Area Networks ("LAN")). Additionally, the communication links to and from the network 905 can be wired or wireless (i.e., terrestrial or satellite-based transceivers). In some implementations, the network 905 is an IP-based wide or metropolitan area network.

The network 905 may have any number of configurations including a star configuration, token ring configuration or other configurations. Furthermore, the network 905 may include a local area network (LAN), a wide area network (WAN) (e.g., the Internet), and/or any other interconnected data path across which multiple devices may communicate. In some implementations, the network 905 may be a peer-to-peer network. The network 905 may also be coupled to or include portions of a telecommunications network for sending data in a variety of different communication protocols. In some implementations, the network 905 includes short-wavelength communication networks or a cellular communications network for sending and receiving data including via short messaging service (SMS), multimedia messaging service (MMS), hypertext transfer protocol (HTTP), direct data connection, wireless application protocol (WAP), electronic messages, etc.

Figure 10:
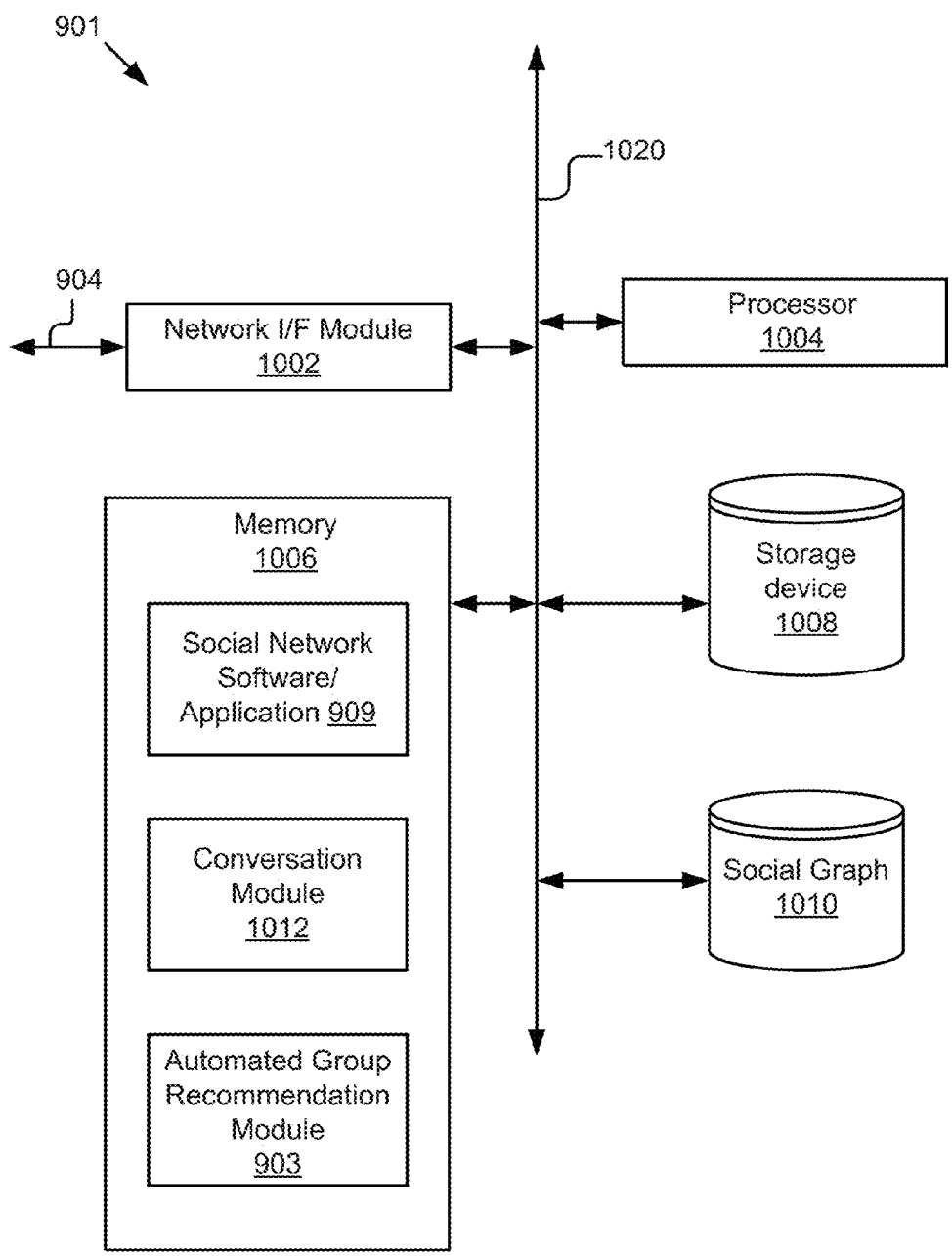
FIG. 10 is a block diagram illustrating an example social network server including an automated group recommendation module.

FIG. 10 illustrates the social network server 901 according to some implementations of the present disclosure. In the illustrated implementations, the social network server 901 includes the network interface (I/F) module 1002, a processor 1004, a memory 1006, a storage device 1008 and a social graph 1010. These components of the social network server 901 are communicatively coupled to a bus or software communication mechanism 1020 for communication with each other.

The network interface module 1002 is coupled to the network 905 by signal line 904. The network interface module 1002 is also coupled to the bus 1020. The network interface module 1002 includes ports for wired connectivity including but not limited to USB, SD, or CAT-5, etc. The network interface module 1002 links the processor 1004 to the network 905 that may in turn be coupled to other processing systems. The network interface module 1002 provides other conventional connections to the network 905 using standard network protocols, e.g., TCP/IP, HTTP, HTTPS and SMTP. In some implementations, the network interface module 1002 includes a transceiver for sending and receiving signals using WiFi, Bluetooth® or cellular communications for wireless communication.

The processor 1004 may include an arithmetic logic unit, a microprocessor, a general purpose controller or some other processor array to perform computations and provide electronic display signals to a display device. In some implementations, the processor 1004 is a hardware processor. The processor 1004 is coupled to the bus 1020 for communication with the other components. Processor 1004 processes data signals and may include various computing architectures including a complex instruction set computer (CISC) architecture, a reduced instruction set computer (RISC) architecture, or an architecture implementing a combination of instruction sets. Although only a single processor is shown in FIG. 10, multiple processors may be included. It should be understood that other processors, operating systems, sensors, displays and physical configurations are possible.

The memory 1006 stores instructions and/or data that may be executed by the processor 1004. In the illustrated implementation, the memory 1006 stores the social network software/application 909, the conversation module 1012 and the automated group recommendation module 903. The memory 1006 is coupled to the bus 1020 for communication with the other components of the social network server 901. The instructions and/or data may include code for performing any and/or all of the techniques described herein. The memory 1006 may be a dynamic random access memory (DRAM) device, a static random access memory (SRAM) device, flash memory or some other memory devices.

The storage device 1008 may be a non-transitory memory that stores data. For example, the storage device 1008 may be a dynamic random access memory (DRAM) device, a static random access memory (SRAM) device, flash memory or some other memory device. In some implementations, the storage device 1008 also includes a non-volatile memory or similar permanent storage device and media, for example, a hard disk drive, a floppy disk drive, a compact disc read only memory (CD-ROM) device, a digital versatile disc read only memory (DVD-ROM) device, a digital versatile disc random access memories (DVD-RAM) device, a digital versatile disc rewritable (DVD-RW) device, a flash memory device, or some other non-volatile storage device. In some implementations, the storage device 1008 stores data received from and sent to users 920 to accomplish the functionalities described herein of the automated group recommendation module 903.

Software communication mechanism 1020 may be an object bus (e.g., CORBA), direct socket communication (e.g., TCP/IP sockets) among software modules, remote procedure calls, UDP broadcasts and receipts, HTTP connections, function or procedure calls, etc. Further, any or all of the communication could be secure (SSH, HTTPS, etc.). The software communication mechanism 1020 can be implemented on any underlying hardware, for example, a network, the Internet, a bus, a combination thereof, etc.

The conversation module 1012 can be software or routines for associated groups to conversations. In FIG. 10, the conversation module 1012 is shown as a module operational a part of memory 1006. In some implementations, the conversation module 1012 may be part of the social network application 909. The social network application 909 may cooperate with the social network application 909 to generate and provide the stream of content. Based upon the user's interests, social graph, interactions and other factors, the stream content module 222, may generate a stream of content tailored to the user. The conversation module 1012 may be software including routines for generating and providing the stream of content such as conversation threads. In some implementations, the conversation module 1012 may be a set of instructions executable by the processor 1004 to provide the functionality described herein for generating and providing the stream of content. In some implementations, the conversation module 1012 may be stored in the memory 1006 of the server 901 and is accessible and executable by the processor 1004. In some implementations, the conversation module 1012 may be adapted for cooperation and communication with the processor 1004 and other components of the server 901 via bus 1020.

The automated group recommendation module 903 is configured to perform a number of functions including: receiving, using one or more processors, information about a first user; constructing, using the one or more processors, a recommended group of other users using the information about the first user; providing, using the one or more processors, the recommended group of other users as suggestion to the first user; and responsive to input from the first user, creating a new group in a service, and performing an action on the new group in the service. The automated group recommendation module 903 includes a number of components as will be described in more detail below with reference to FIG. 11. These components cooperate to provide the functions described above and described in detail with reference to FIGS. 1-8. The automated group recommendation module 903 may also generate suggestions for users to join existing groups.

The automated group recommendation module 903 also receives and processes the signals from the social network application 909 to retrieve credential and authorization information. In some implementations, the automated group recommendation module 903 can receive and process signals from other sources, for example a profile server, to retrieve credential and authorization information. In some implementations, the automated group recommendation module 903 may interact with the third party server 907, the Micro Blogging server 921, the email server 923, the SMS/MMS server, the IM server 931, the search server 935 and any other entities (not pictured) for executing transactions that can be included in the system 900. In some implementations, the automated group recommendation module 903 may be an application that can be activated or installed on the mobile device of the user.

Figure 11:
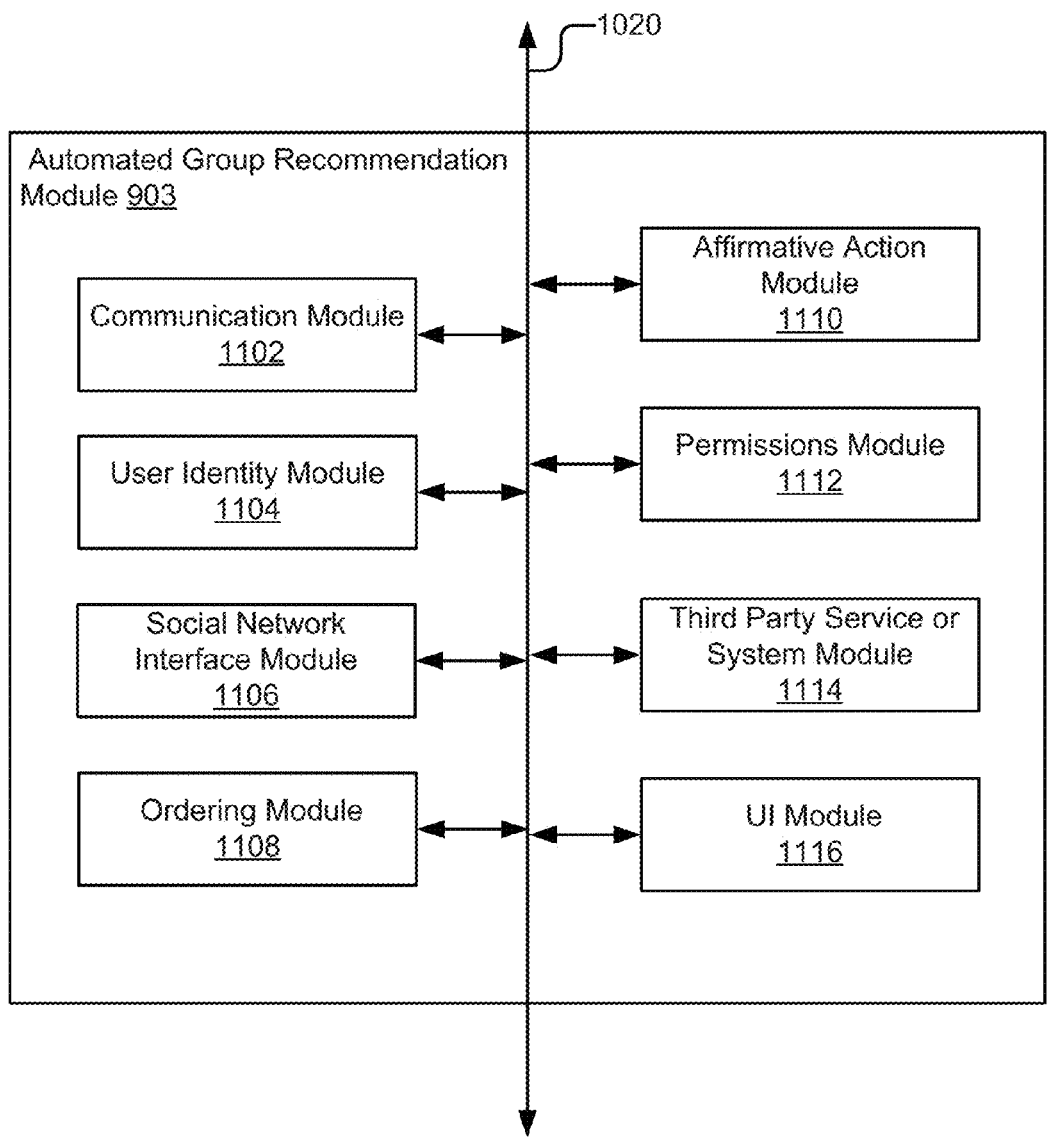
FIG. 11 is a block diagram illustrating an example group recommendation module stored on the social network server.

Referring now to FIG. 11, the automated group recommendation module 903 is described in more detail according to some implementations. The automated group recommendation module 903 includes a communication module 1102, a user identity module 1104, a social network interface module 1106, an ordering module, an affirmative action module 1110, a permissions module 1112, a third-party service or system module 1114, and a user interface module 1116.

The communication module 1102 can be software or routines for handling communications between the user identity module 1104, the social network interface module 1106, the ordering module 1108, the affirmative action module 1110, the permissions module 1112, the third-party service or system module 1114, and the user interface module 1116. The communication module 1102 also facilitates communication with the other components of the social network server 901 as well as communication with the other components of the system 900 via the network interface module 1002 and the network 905. For example, the communication module 1102 may send signals between servers and the components of the automated group recommendation module 903. Further the communication module 1102 may cooperate with the other servers of FIG. 9 to receive or retrieve the information described above with reference to FIG. 2A. In some instances, this function is performed by the communication module 1102 unless described otherwise in this application as being performed by another module of the automated group recommendation module 903. In some implementations, the communication module 1102 is a set of instructions executable by the processor 1004. In some implementations, the communication module 1102 is stored in the memory 1006 of the social network server 901 and is accessible and executable by the processor 1004. In some implementations, the communication module 1102 is adapted for cooperation and communication with the processor 1004, the memory 1006 and other components of the automated group recommendation module 903 via the bus 1020.

The user identity module 1104 can be software or routines for determining an identification (ID) for a user. In some implementations, the identification is associated with a portable device and may include a user name and password. For example, the identification may be the username and password corresponding to a user to access the social network application 909 for retrieval of social information of the user. In some implementations, the identification is the username and password used for a profile server. The profile server (not pictured) in turn may include other usernames and passwords for other systems and devices. The user identity module 1104 includes routines for accessing identity information so that the other components of the automated group recommendation module 903 can retrieve other information (e.g., location, access to services, access to devices, interests, relationships or social graphs, etc.) from other systems. In some implementations, the user identity module 1104 is a set of instructions executable by the processor 1004. In some implementations, the user identity module 1104 is stored in the memory 1006 of the social network server 901 and is accessible and executable by the processor 1004. In some implementations, the user identity module 1104 is adapted for cooperation and communication with the processor 1004, the memory 1006 and other components of the automated group recommendation module 903 via the bus 1020.

The social network interface module 1106 can be software or routines for retrieving social network information using the identification for the user. The social network interface module 1106 is coupled to receive identity information from the user identity module 1104. Using the identity information, the social network interface module 1106 can retrieve relationship information or any other information from the social network application 909. The social network interface module 1106 can also retrieve social information (e.g., posts, shares, re-shares, endorsements, interests, topics of social network activities, people interacting with on the social network, relationships or social graphs, etc.). This relationship information or social information can be used to recommend groups. In some implementations, the social network interface module 1106 is a set of instructions executable by the processor 1004. In some implementations, the social network interface module 1106 is stored in the memory 1006 of the social network server 901 and is accessible and executable by the processor 1004. In some implementations, the social network interface module 1106 is adapted for cooperation and communication with the processor 1004, the memory 1006 and other components of the automated group recommendation module 903 via the bus 1020. In such a manner, the social network interface module 1106 can provide relationship information or social information to the other components of the automated group recommendation module 903.

The ordering module 1108 can be software or routines for sorting a plurality of group recommendations. The sorting may be performed so that the most plausible recommendations are ordered highest in the sorted list. In some implementations, the ordering module 1108 is a set of instructions executable by the processor 1004. In some implementations, the ordering module 1108 is stored in the memory 1006 of the social network server 901 and is accessible and executable by the processor 1004. In some implementations, the ordering module 1108 is adapted for cooperation and communication with the processor 1004, the memory 1006 and other components of the automated group recommendation module 903 via the bus 1020.

The affirmative action module 1110 can be software or routines for receiving and processing affirmative actions or any explicit user input. For example, the affirmative action module 1110 may record a user's search engine queries or blog posts. In some implementations, the affirmative action module 1110 is a set of instructions executable by the processor 1004. In some implementations, the affirmative action module 1110 is stored in the memory 1006 of the social network server 901 and is accessible and executable by the processor 1004. In some implementations, the affirmative action module 1110 is adapted for cooperation and communication with the processor 1004, the memory 1006 and other components of the automated group recommendation module 903 via the bus 1020.

The permissions module 1112 can be software or routines for retrieving authentication or credential information and allow access to content based in part on authentication or credential information. The permissions module 1112 can provide the authentication or credential information to the other components of the automated group recommendation module 903 for use in performing their functions. In some implementations, the permissions module 1112 cooperates with the social network interface module 1106 to retrieve authentication or credential information from the social network application 909. The authentication or credential information may be used by the affirmative action module 1110 to filter data from the first set of information. In some implementations, the permissions module 1112 retrieves the authentication or credential information from the third-party systems, third party services, or devices themselves. In some implementations, the permissions module 1112 is a set of instructions executable by the processor 1004. In some implementations, the permissions module 1112 is stored in the memory 1006 of the social network server 901 and is accessible and executable by the processor 1004. In some implementations, the permissions module 1112 is adapted for cooperation and communication with the processor 1004, the memory 1006 and other components of the automated group recommendation module 903 via the bus 1020.

The third-party service or system module 1114 can be software or routines for fulfilling a third-party service or system group recommendation requests. More specifically, the third-party service or system module 1114 identifies any third-party services or systems with which the user interacts. The third-party service or system module 1114 is coupled to receive the group recommendation, the identity and information from other modules and determine what actions or services that the third-party service or system can provide that are relevant for a given service or system and user. The third-party service or system module 1114 provides communication protocols for communication with the third-party service or system. In some implementations, the third-party service or system module 1114 provides a link to perform the action or transaction on an identified third-party service or system to the affirmative action module 1110. It should be understood that the third-party service or system module 1114 also receives information from the user and cooperates with the other components of the automated group recommendation module 903 to perform the action or transaction with the third-party service or system 1114. In some implementations, the third party service may be any other service(s) provided by the system 900 or other third party server 907, for example, a payment service, a reservation service, a check-in service, a check out service, an ordering service, a confirmation service, a notification service, an accessing (opening, closing, locking or unlocking) service, a communication service, a location service, a language translation service, a polling service, a verification service, a recording service or other service related to a place. In some implementations, the third-party service or system module 1114 is a set of instructions executable by the processor 1004. In some implementations, the third-party service or system module 1114 is stored in the memory 1006 of the social network server 901 and is accessible and executable by the processor 1004. In some implementations, the third-party service or system module 1114 is adapted for cooperation and communication with the processor 1004, the memory 1006 and other components of the automated group recommendation module 903 via the bus 1020.

The user interface module 1116 can be software or routines for generating a user interface element. The user interface module 1116 also generates updates to the user interface element. The user interface module 1116 processes these changes to produce updates to the user interface element. In some implementations, the user interface module 1116 is a set of instructions executable by the processor 1004. In some implementations, the user interface module 1116 is stored in the memory 1006 of the social network server 901 and is accessible and executable by the processor 1004. In some implementations, the user interface module 1116 is adapted for cooperation and communication with the processor 1004, the memory 1006 and other components of the automated group recommendation module 903 via the bus 1020.

In situations in which the systems, for example the automated group recommendation module 903, discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the automated group recommendation module 903 that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (e.g. to a city, ZIP code, or state level), so that a particular location of a user cannot be determined. Thus, the user may have control over how information is collected about the user and used by the automated group recommendation module 903.

Systems and methods for automatically creating and recommending groups have been described. While the present disclosure is described in the context of a social network and a video sharing server, it should be understood that the terms "products" and "services" are used interchangeably throughout this specification and are used herein to encompass their plain and ordinary meaning including, but not limited to any online service, online product, online software that provides services to users.

In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to user interfaces and particular hardware. Moreover, the technologies disclosed above primarily in the context of on line services; however, the disclosed technologies apply to other data sources and other data types (e.g., collections of other resources for example images, audio, web pages).

Reference in the specification to "one implementation" or "an implementation" means that a particular feature, structure, or characteristic described in connection with the implementation is included in at least one implementation of the disclosed technologies. The appearances of the phrase "in one implementation" in various places in the specification are not necessarily all referring to the same implementation.

Some portions of the detailed descriptions above were presented in terms of processes and symbolic representations of operations on data bits within a computer memory. A process can generally be considered a self-consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers or the like.

These and similar terms can be associated with the appropriate physical quantities and can be considered labels applied to these quantities. Unless specifically stated otherwise as apparent from the prior discussion, it is appreciated that throughout the description, discussions utilizing terms for example "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, for example, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The disclosed technologies can take the form of an entirely hardware implementation, an entirely software implementation or an implementation containing both hardware and software elements. In some implementations, the technology is implemented in software, which includes but is not limited to firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A computer-implemented method comprising:
receiving, using one or more processors, information about a first user;
constructing, using the one or more processors, a first recommended group and a second recommended group of other users using the information about the first user;
generating a first graphical user interface element representing the first recommended group based on a pictorial image of a member of the first recommended group;
generating a second graphical user interface element representing the second recommended group;
determining an amount of overlap between the first graphical user interface element and the second graphical user interface element based on relevancy of the first and second recommended groups to the first user;
providing, using the one or more processors, for display the first and second graphical user interface elements with the determined amount of overlap as a suggestion to the first user; and
responsive to a selection of the first graphical user interface element or the second graphical user interface element from the first user, creating a new group in a service, and performing an action on the new group in the service.

2. The method of claim 1, wherein the service is a social network service or a video sharing service.

3. The method of claim 1, wherein the information about the first user is one or more of profile data, content metadata, viewing history, explicit input, inferred data, proximity data social network data or video sharing data.

4. The method of claim 1, wherein generating the first graphical user interface element includes generating a slide show of a plurality of elements, wherein each of the plurality of elements is a pictorial representation of a user in the first recommended group.

5. The method of claim 4, wherein the plurality of elements correspond to a set of most active users in the first recommended group.

6. The method of claim 1, wherein generating the first graphical user interface element includes generating a plurality of elements, each element being a pictorial representation of a user in the first recommended group, and the first graphical user interface element comprising the plurality of elements in overlapping positions with elements for a set of most active users shown with less overlap than other elements corresponding to the other users in the first recommended group.

7. The method of claim 1, wherein generating the first graphical user interface element includes retrieving a picture from a social network, the picture including a predefined set of members of the first recommended group.

8. The method of claim 1, wherein the action is one of: posting a comment, posting an endorsement, sending a message, sending a photo, sending a video, sharing content, updating a group list, and modifying an access permission.

9. A computer program product comprising a non-transitory computer usable medium including a computer readable program, wherein the computer readable program when executed on a computer causes the computer to:
receive information about a first user;
construct a first recommended group and a second recommended group of other users using the information about the first user;
generate a first graphical user interface element representing the first recommended group based on a pictorial image of a predefined number of member of the first recommended group;
generate a second graphical user interface element representing the second recommended group;
determine an amount of overlap between the first graphical user interface element and the second graphical user interface element based on relevancy of the first and second recommended groups to the first user;
provide for display the first and second graphical user interface elements with the determined amount of overlap as a suggestion to the first user; and
responsive to a selection of the first graphical user interface element or the second graphical user interface element from the first user, create a new group in a service, and performing an action on the new group in the service.

10. The computer program product of claim 9, wherein the service is a social network service or a video sharing service.

11. The computer program product of claim 9, wherein the information about the first user is one or more of profile data, content metadata, viewing history, explicit input, inferred data, proximity data social network data or video sharing data.

12. The computer program product of claim 9, wherein generating the first graphical user interface element includes generating a slide show of a plurality of elements, wherein each of the plurality of elements is a pictorial representation of a user in the first recommended group.

13. The computer program product of claim 12, wherein the plurality of elements correspond to a set of most active users in the first recommended group.

14. The computer program product of claim 9, wherein generating the first graphical user interface element includes generating a plurality of elements, each element being a pictorial representation of a user in the first recommended group, and the first graphical user interface element comprising the plurality of elements in overlapping positions with elements for a set of most active users shown with less overlap than other elements corresponding to the other users in the first recommended group.

15. The computer program product of claim 9, wherein generating the first graphical user interface element includes retrieving a picture from a social network, the picture including a predefined set of members of the first recommended group.

16. The computer program product of claim 9, wherein the action is one of: posting a comment, posting an endorsement, sending a message, sending a photo, sending a video, sharing content, updating a group list, and modifying an access permission.

17. A system comprising:
a processor; and
a memory storing instructions that, when executed, cause the system to:
receive information about a first user;
construct a first recommended group and a second recommended group of other users using the information about the first user;

generate a first graphical user interface element representing the first recommended group based on a pictorial image of a member of the first recommended group;

generate a second graphical user interface element representing the second recommended group;

determine an amount of overlap between the first graphical user interface element and the second graphical user interface element based on relevancy of the first and second recommended groups to the first user;

provide for display the first and second graphical user interface elements with the determined amount of overlap as a suggestion to the first user; and responsive to a selection of the first graphical user interface element or the second graphical user interface element from the first user, create a new group in a service, and performing an action on the new group in the service.

18. The system of claim 17, wherein the service is a social network service or a video sharing service.

19. The system of claim 17, wherein the information about the first user is one or more of profile data, content metadata, viewing history, explicit input, inferred data, proximity data social network data or video sharing data.

20. The system of claim 17, wherein generating the first graphical user interface element includes generating a slide show of a plurality of elements, wherein each of the icons plurality of elements is a pictorial representation of a user in the first recommended group.

21. The system of claim 20, wherein the plurality of elements correspond to a set of most active users in the first recommended group.

22. The system of claim 17, wherein generating the first graphical user interface element includes generating a plurality of elements, each element being a pictorial representation of a user in the first recommended group, and the first graphical user interface element comprising the plurality of elements in overlapping positions with elements for a set of most active users shown with less overlap than other elements corresponding to the other users in the first recommended group.

23. The system of claim 17, wherein generating the first graphical user interface element includes retrieving a picture from a social network, the picture including a predefined set of members of the first recommended group.

24. The system of claim 17, wherein the action is one of: posting a comment, posting an endorsement, sending a message, sending a photo, sending a video, sharing content, updating a group list, and modifying an access permission.

* * * * *